United States Patent
Steidle et al.

(10) Patent No.: US 9,342,838 B2
(45) Date of Patent: *May 17, 2016

(54) SYSTEM AND METHOD FOR PROVIDING A REWARDS PROGRAM BASED ON ELECTRONIC ACQUISITION OF A DISPLAYED DYNAMIC MARK

(71) Applicant: PNS COMMUNICATIONS, LLC, Rancho Sante Fe, CA (US)

(72) Inventors: Wayne Steidle, Lake Mary, FL (US); Yixin Chen, Memphis, TN (US)

(73) Assignee: PNS Communications, LLC, Longwood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,606

(22) Filed: Jan. 28, 2015

(65) Prior Publication Data
US 2015/0287070 A1    Oct. 8, 2015

Related U.S. Application Data

(63) Continuation-in-part of application No. 14/287,356, filed on May 27, 2014, now Pat. No. 9,204,060, which is a continuation-in-part of application No. PCT/US2014/039508, filed on May 27, 2014.

(60) Provisional application No. 61/976,043, filed on Apr. 7, 2014.

(51) Int. Cl.
*G06K 19/06* (2006.01)
*G06Q 30/02* (2012.01)
*G06Q 50/00* (2012.01)

(52) U.S. Cl.
CPC ........ *G06Q 30/0231* (2013.01); *G06Q 30/0236* (2013.01); *G06Q 50/01* (2013.01)

(58) Field of Classification Search
CPC ... G06K 19/06037; G06K 7/14; B42D 15/10; G07F 7/1008; G06Q 20/341; G06Q 30/02
USPC .................... 235/494, 487, 380, 375
See application file for complete search history.

(56) References Cited

U.S. PATENT DOCUMENTS 6,550,685 B1    4/2003  Kindberg
9,204,060 B2 * 12/2015  Steidle ................... H04N 5/265

(Continued)

OTHER PUBLICATIONS

International Search Report issued Oct. 16, 2014 in International Patent Application No. PCT/US2014/39508 (21 pages).

(Continued)

*Primary Examiner* — Karl D Frech
(74) *Attorney, Agent, or Firm* — Fox Rothschild LLP; Robert J. Sacco; Carol E. Thorstad-Forsyth

(57) ABSTRACT

Systems (100) and methods (2000) for providing a rewards program. The method involves presenting a Digital Dynamic Mark ("DDM") to a viewer that comprises a sequence of Active Image Patterns ("AIPs"). Each AIP exclusively comprises First Pattern Regions ("FPRs") for encoding symbols. At least two FPRs are rendered with at least one color other than a defined background color for the image pattern. The FPRs are arranged in a non-grid like pattern. Each FPR has a non-square shape with a single side boundary line directly abutting a single side boundary line of at least one other FPR. Information is received which indicates that the viewer captured an image of the DDM using a computing device thereof. Reward points are awarded to the viewer for capturing the image of the DDM. The reward points are redeemable by the viewer for one or more redemption items.

20 Claims, 21 Drawing Sheets

(56) References Cited

U.S. PATENT DOCUMENTS

| | | |
|---|---|---|
| 2002/0162120 A1 | 10/2002 | Mitchell |
| 2010/0147961 A1 | 6/2010 | Jancke |
| 2012/0039529 A1 | 2/2012 | Rujan |
| 2012/0130851 A1 | 5/2012 | Minnick et al. |
| 2012/0132721 A1 | 5/2012 | Mizukoshi et al. |
| 2012/0148089 A1 | 6/2012 | Vashistha et al. |
| 2012/0274775 A1 | 11/2012 | Reiffel |
| 2013/0003963 A1 | 1/2013 | Prakash et al. |
| 2013/0325567 A1 | 12/2013 | Bradley et al. |

OTHER PUBLICATIONS

International Search Report and Written Opinion mailed Apr. 20, 2015 in PCT/US15/13264 (13 pages).

U.S. Appl. No. 14/287,356, filed May 27, 2014, System and Method for Embedding Dynamic Marks Into Visual Images in a Detectable Manner.

* cited by examiner

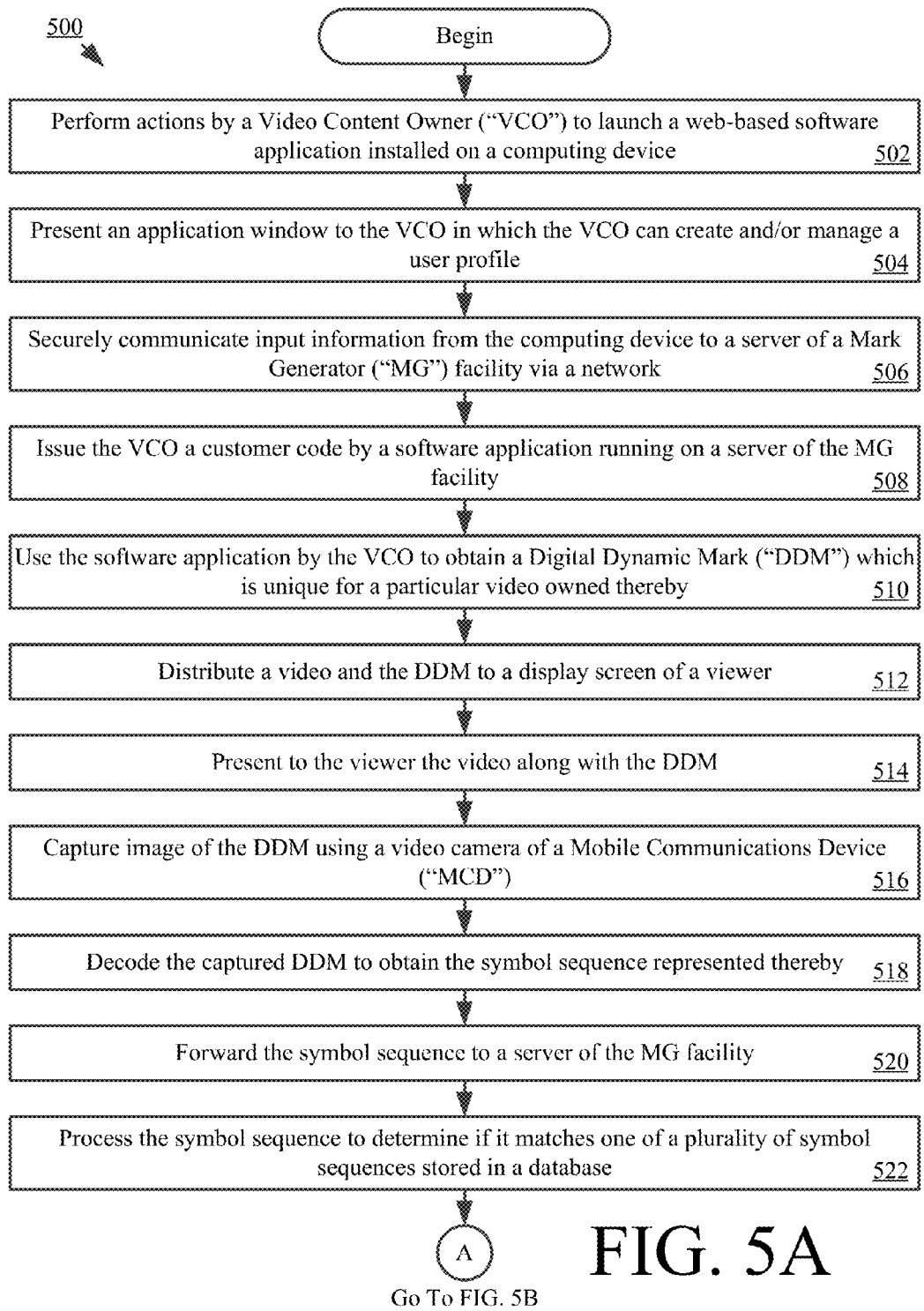

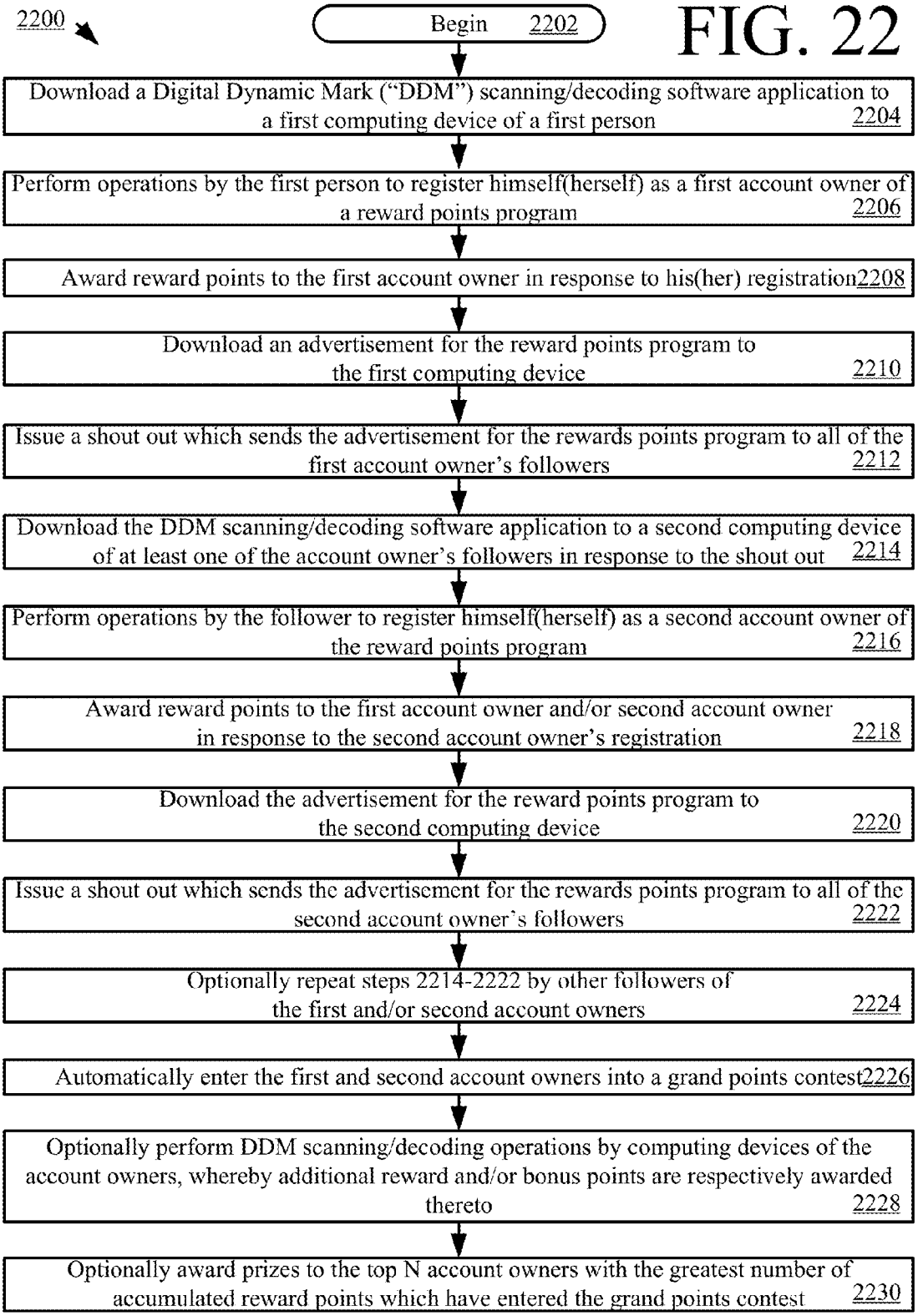

SYSTEM AND METHOD FOR PROVIDING A REWARDS PROGRAM BASED ON ELECTRONIC ACQUISITION OF A DISPLAYED DYNAMIC MARK

CROSS REFERENCE TO RELATED APPLICATIONS

This application is a continuation-in-part application of U.S. patent application Ser. No. 14/287,356 filed May 27, 2014 and International Patent Application No. PCT/US2014/039508 filed on May 27, 2014, which both claim the benefit of U.S. Provisional Patent Application Ser. No. 61/976,043 filed Apr. 7, 2014.

BACKGROUND OF THE INVENTION

1. Statement of the Technical Field

The inventive arrangements relate to systems and methods for providing a rewards program for entertainment consumers. More particularly, the invention concerns systems and methods for providing a rewards program based on electronic acquisitions of displayed dynamic marks.

2. Description of the Related Art

Due to the technical complexities involved, the convergence of digital media as displayed on a TV, or a video screen, and a wireless smart device such as a smartphone, has been virtually non-existent. Although there have been attempts to connect the two mediums each have their own serious limitations, and are simply not ideal, or practical. The limitations for optical based systems include, but are not limited to, requiring a very short distance from the video display to capture information, ambient light in the room in which the video display is being viewed can render the receiver unusable, variations in the video display output can render the receiver unusable, and the time it takes for the receiver to actually capture the information. Because of these, and other unreliable limitations, the user is likely to get frustrated and simply give up.

The limitations for Audio based systems include but are not limited to, the volume level and proximity to the audio transmitter, the quality of the audio output, background noise such as talking, music, or other sounds which can interfere with the receiver, and the time it takes for the receiver to actually capture the information. Because of these, and other unreliable limitations, the user is likely to get frustrated and simply give up.

A need has therefore been recognized in the art to provide a reliable and robust solution to the problem. The system preferably facilitates the convergence of video displayed information directly, quickly, and wirelessly, to all of the currently available, and future smart devices such as smartphones, tablets, wearable's such as watches, glasses and others not yet known to the market. Further, the solution should include a method for advertisers to engage their customers and maximize the response to their commercials by enabling viewers to acquire digital coupons and other incentive offers associated with the video broadcast commercial. There is also a need to provide new and different backend solutions for utilizing these devices and methods.

SUMMARY OF THE INVENTION

The present invention concerns systems and methods for providing a rewards program. The methods involving presenting a video comprising a Digital Dynamic Mark ("DDM") to a first viewer; receiving information indicating that the first viewer captured an image of the DDM using a computing device thereof; and awarding reward points to the first viewer for capturing the image of the DDM, where the reward points are redeemable by the first viewer for at least one of a plurality of redemption items. Reward points may also be awarded to each of a plurality of individuals for registering with the rewards program. In this case, at least a first individual may be a follower of at least a second individual on a social media site.

The DDM comprises a sequence of active image patterns. Each active image pattern exclusively comprises a plurality of first pattern regions for encoding symbols. At least two of the first pattern regions are rendered with at least one color (e.g., red, green and/or blue) other than a defined background color for the image pattern. The first pattern regions are arranged in a non-grid like pattern. Each first pattern region has a non-square shape (e.g., a rectangular or triangular shape) with a single side boundary line directly abutting a single side boundary line of at least one other first pattern region, whereby no spacing is provided between adjacent ones of the first pattern regions. At least two of the first pattern regions has the same or different shapes.

In some scenarios, the sequence of first active image patterns is appended to an end of a sequence of second active image patterns. Each second active image pattern indicates which symbol of a plurality of symbols is represented by a particular active image pattern that may possibly be contained in a customer-specific portion of any one of a plurality of DDMs. An inactive image pattern is appended to an end of a sequence of first active image patterns. The inactive image pattern comprises a plurality of second pattern regions all rendered with the defined background color or black. The sequences of first active image patterns, the sequence of second active image patterns and the inactive image pattern are then sequentially displayed along with or as a video.

The present disclosure also concerns systems and methods for using a DDM to obtain reward points. The methods involve: capturing a DDM being presenting along with or as a video using a video camera of a computing device; decoding by the computing device the DDM to obtain a sequence of decoded symbols; and communicating the sequence of decoded symbols from the computing device to a remote computing device. At the remote computing device, at least one first reward point is awarded to an individual associated with the computing device for capturing the DDM using the video camera. At least one second point may have been previously awarded to the individual in response to the individual's registration with a rewards program. At least one third reward points may have also been awarded to a follower of the individual on a social media site for the follower's registration with the rewards program.

BRIEF DESCRIPTION OF THE DRAWINGS

Embodiments will be described with reference to the following drawing figures, in which like numerals represent like items throughout the figures, and in which:

FIGS. 5A-5B collectively provide a flow diagram that is useful for understanding the operation of the system shown in FIG. 1.

FIG. 22 is a flow diagram of an exemplary method for providing a referral plan in which points are awarded to account owners and followers thereof.

DETAILED DESCRIPTION

Figure 1:
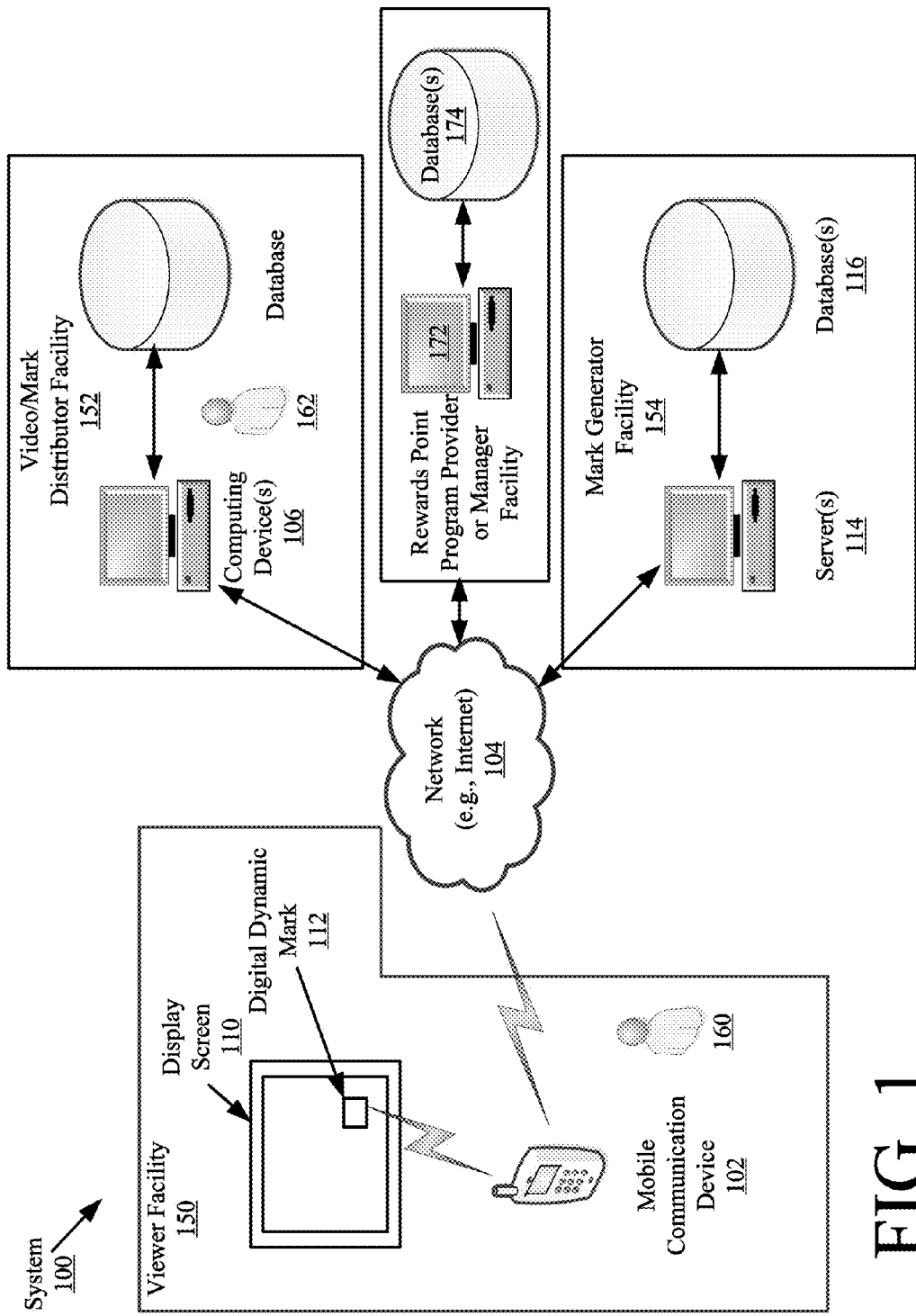
FIG. 1 provides a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Overview

The present invention concerns systems and methods for providing a rewards program for entertainment consumers based on electronic acquisitions of displayed dynamic marks. Each dynamic mark comprises a dynamic code that may make up a video clip and/or be embedded or layered within or on top of a video. The dynamic code will be described in detail below. Still, it should be appreciated that the dynamic code is a novel code which overcomes various drawbacks of conventional matrix codes (e.g., QR codes) used in conjunction with the video. For example, conventional QR codes require positioning symbols. The dynamic code does not require such positioning symbols, and thus is a more efficient code. Also, conventional QR codes are two tone codes (i.e., black and white codes). In contrast, the dynamic code of the present invention employs more than two tones (e.g., black, red, green, and blue). As such, when using the same resolution on a reader device, the dynamic code can specify a greater amount of total possible information as compared to conventional QR codes.

Additionally, QR codes suffer from data loss as a result of "bleeding" of encoded data points at least partially because of their square shapes, relatively small sizes, and strict grid structure in which each square falls within only one cell of a grid. In contrast, the dynamic code of the present invention does not suffer from such "bleeding" since the pattern regions have non-square shapes (e.g., circular shapes, rectangular shapes or arbitrary shapes selected in accordance with a particular application), relatively large sizes, and a non-grid structure (i.e., each pattern region does not fall exclusively within a single cell of a grid, rather overlaps multiple cells of a grid).

Furthermore, the QR codes and other conventional codes are absent of a mechanism for preventing (a) channel noise, (b) different lighting variations, color variations and color distortions of a plurality of display screens, and (c) variations in the optical characteristics of different image/video capturing devices from causing errors in a subsequent decoding process. The dynamic code of the present invention advantageously includes such a mechanism, namely a code book portion. The code book portion will be described in detail below. Still, it should be understood that the code book portion of the present invention generally comprises a sequence of color coded image patterns defining what symbol of a plurality of symbols (e.g., digits 0-5) each possible pattern in a subsequent customer-specific portion of the dynamic code represents. The code book portion provides reference image patterns to which the image patterns of the customer-specific portion can be compared for purposes of determining the sequence of symbols represented thereby. Accordingly, the code book portion provides a dynamic calibration system for each individual display screen and its surrounding environment. Thus, the code book portion ensures that the message delivery technique of the present invention functions properly regardless of the particular display screen on which the dynamic code is displayed and/or the surrounding environment in which the display screen resides.

Dynamic Mark Generating And Displaying System

Referring now to FIG. 1, there is provided a schematic illustration of an exemplary system 100 that is useful for understanding the present invention. System 100 comprises a Mark Generator ("MG") facility 154, a Video/Mark Distributor ("VMD") facility 152, and a viewer facility 150. At the MG facility 154, a DDM 112 is generated based on information provided by a Video Content Owner ("VCO") 162 or a live broadcast owner located in the VMD facility 152. Thereafter, the DDM 112 is presented to a viewer 160 on a display screen 110 located in the viewer's facility 150. The DDM 112 may be displayed in the form of a video clip. The DDM video clip may be displayed along with a video or form part of the video. In this regard, the DDM 112 may be embedded in or layered on top of the video which is owned by the VCO 162, as will be described further below. The video and mark may be distributed to viewers by the VCO 162 and/or another entity (e.g., a television station).

The VMD facility 152 is shown as comprising both the VCO's facility (e.g., a commercial owner) and a video distributor facility (e.g., a television station). Embodiments of the present invention are not limited in this regard. Two or more separate and distinct facilities can be provided for the VCO and/or the video distributor.

Figure 2:
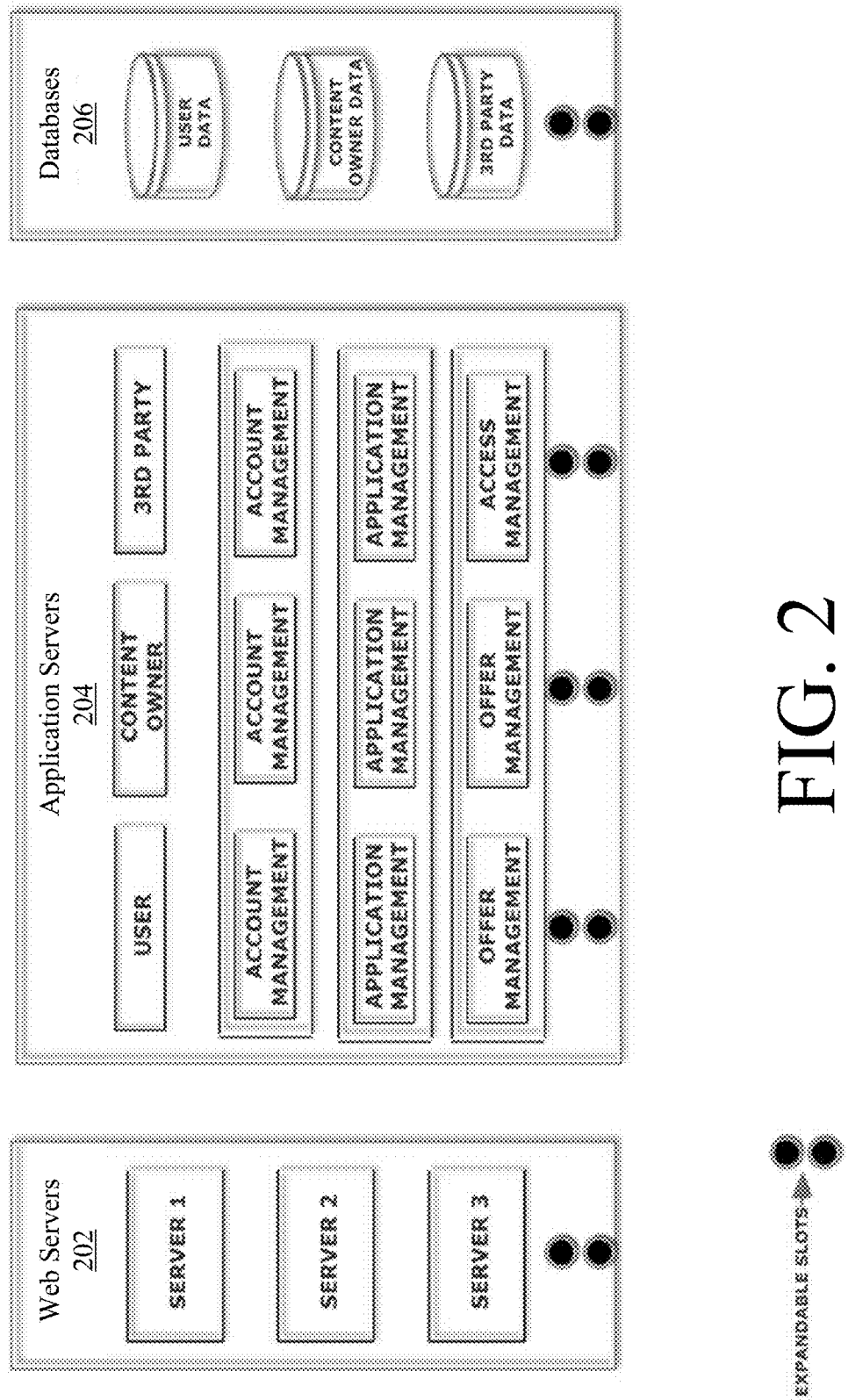
FIG. 2 provides a schematic illustration of an exemplary server/database architecture.

Also, the MGF 154 is shown as comprising at least one server 114 and at least one database 116. In some scenarios, the MGF 154 comprises a plurality of web servers 202, a plurality of application servers 204, and/or a plurality of databases 206 as shown in FIG. 2. The present invention is not limited in this regard. Any server/database architecture can be employed herein without limitation.

The operation of system 100 will now be described with reference to FIGS. 1-18. As shown by step 502 of FIG. 5, the operations begin when the VCO 162 launches a web-based software application installed on a computing device 106 located in the VMD facility 152. The computing device 106 includes, but is not limited to, a desktop computer, a personal computer, a laptop computer, a personal digital assistant, a table computer or a smart device. Each of the listed devices is well known in the art, and therefore will not be described herein.

Figure 5B:
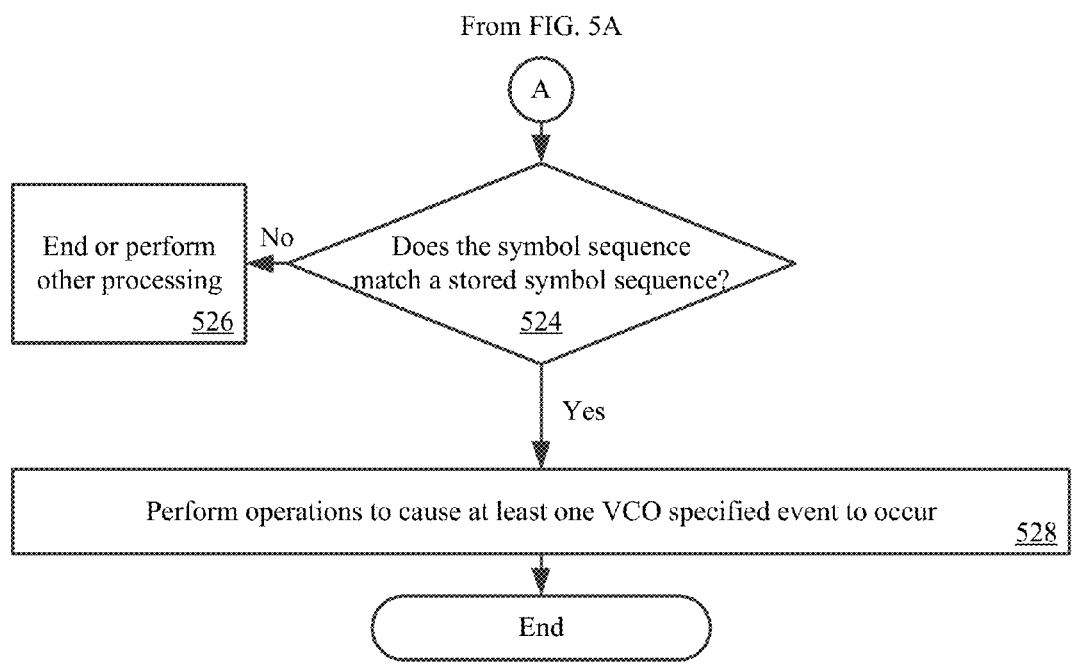
Figure 6:
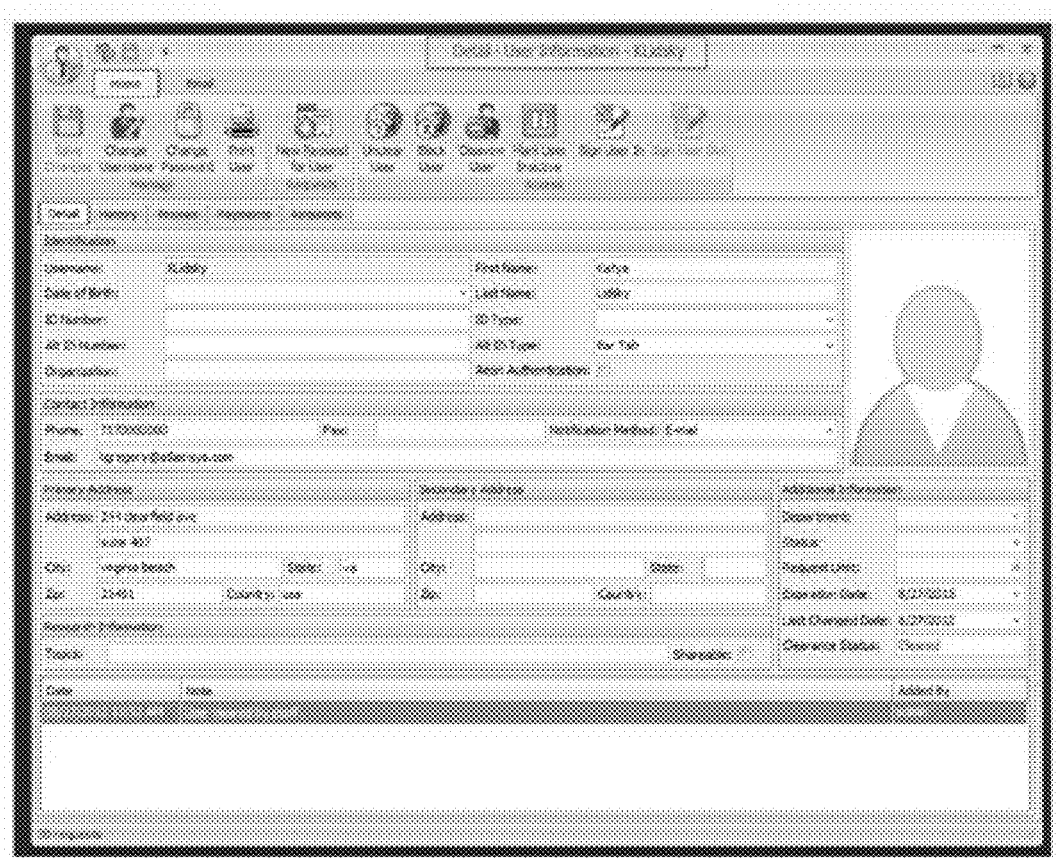
FIG. 6 is a schematic illustration of an exemplary graphical user interface for creating and managing a user profile.

As a consequence of launching the web-based software application, the VCO 162 is presented with an application window in which (s)he can create and/or manage a user profile, as shown by step 504 of FIG. 5. A schematic illustration of an exemplary architecture for the application window is provided in FIG. 6. As shown in FIG. 6, a form is presented in the application window whereby the VCO 162 is prompted to enter certain customer-specific information (e.g., identification information, contact information (e.g., primary address, secondary address), etc. . . . ) for creating a customer profile.

Upon completing the form, step 506 is performed in which the input information is securely communicated from the computing device 106 to a server 114 of the MG facility 154 via a network 104 (e.g., the Internet). This secure communication can be achieved using cryptographic technologies, virtual network technologies and/or secure DNS server technologies. At server 114, the VCO 162 is issued a customer code (or account number) 602 by a software application running on a server 114 of the MG facility 154, as shown by step 508 of FIG. 5. The customer code 602 can be a numeric code (e.g., "12"), an alpha numeric code, or an alphabetic code.

Figure 7:
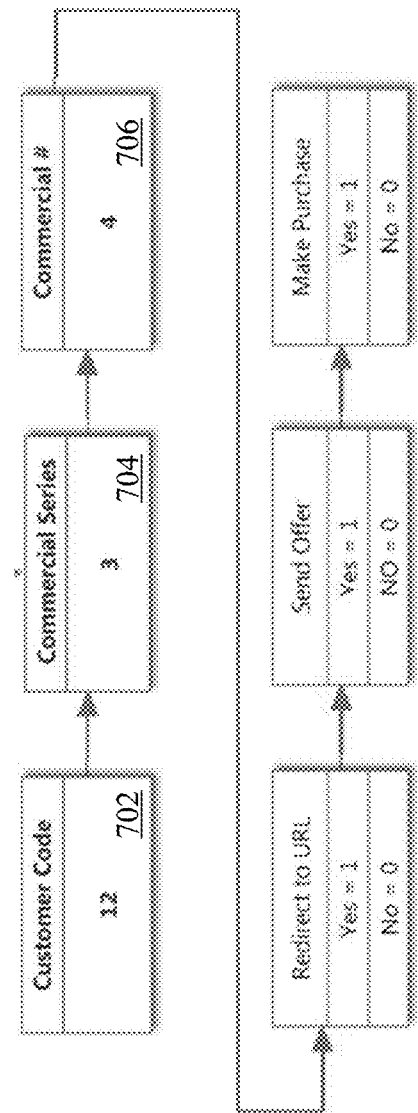
FIG. 7 is a schematic illustration useful for understanding operations performed by a video content owner within the system of FIG. 1.

Thereafter in step 510, the VCO 162 uses the software application to obtain a DDM 112, which is unique for a particular video owned thereby. In this regard, the VCO 162 logs into a web based mark generation service via a web browser. Once logged into the web based mark generation service, the VCO 162 is prompted to input additional information that can be used by server 114 to generate the unique DDM 112. For example, as shown in FIG. 7, the VCO 162 performs user-software operations to specify a commercial series 604 (e.g., "3") and a commercial number 606 (e.g., "4") within the series for which the DDM 112 is to be generated. The VCO 162 may also select events (e.g., redirect to URL, send offer, or make purchase) which should occur as a result of the acquisition of the DDM 112 by a viewer of the corresponding video using a Mobile Communication Device ("MCD") 102 thereof. Notably, these events can be changed at any time by the VCO 162, and therefore resulting actions from acquiring the DDM can be static or variable over a given period of time. This additional information is then securely communicated from the computing device 106 to a server 114 of the MG facility 154 via a network 104 (e.g., the Internet). In response to the reception of the additional information, the server 114 performs operations to create or generate the DDM 112. The DDM 112 is then sent from the server 114 to the computing device 106.

Figure 8:
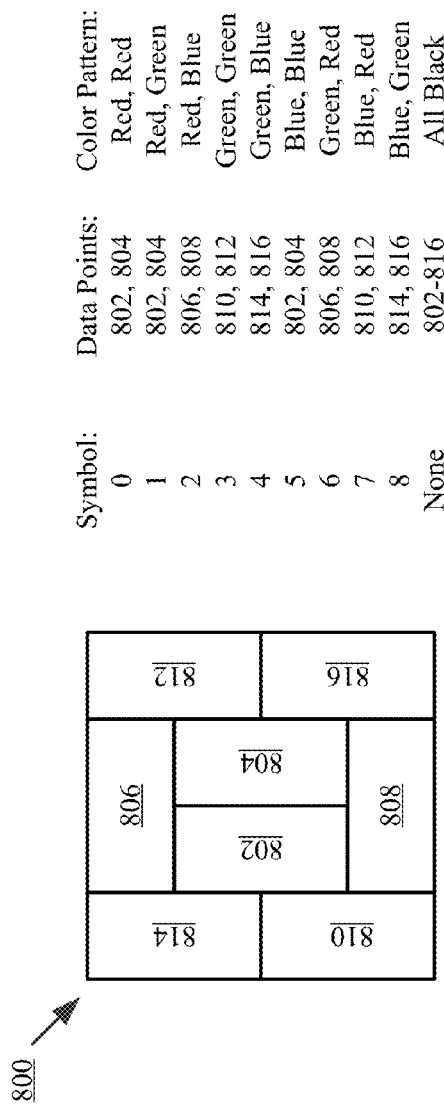
FIG. 8 is a schematic illustration that is useful for understanding an exemplary architecture of a DDM.
Figure 9:
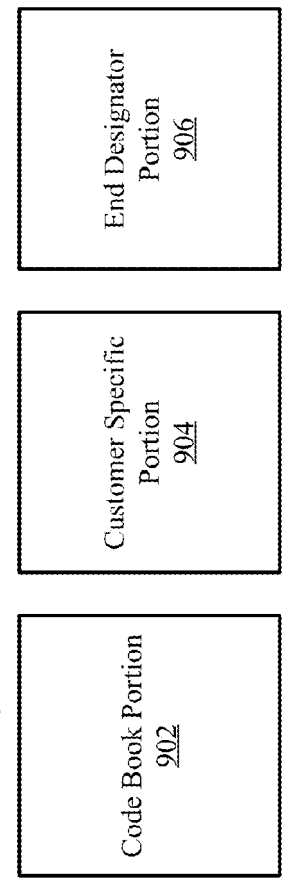
FIGS. 9-12 provide schematic illustrations that are useful for understanding contents of a DDM.
Figure 10:
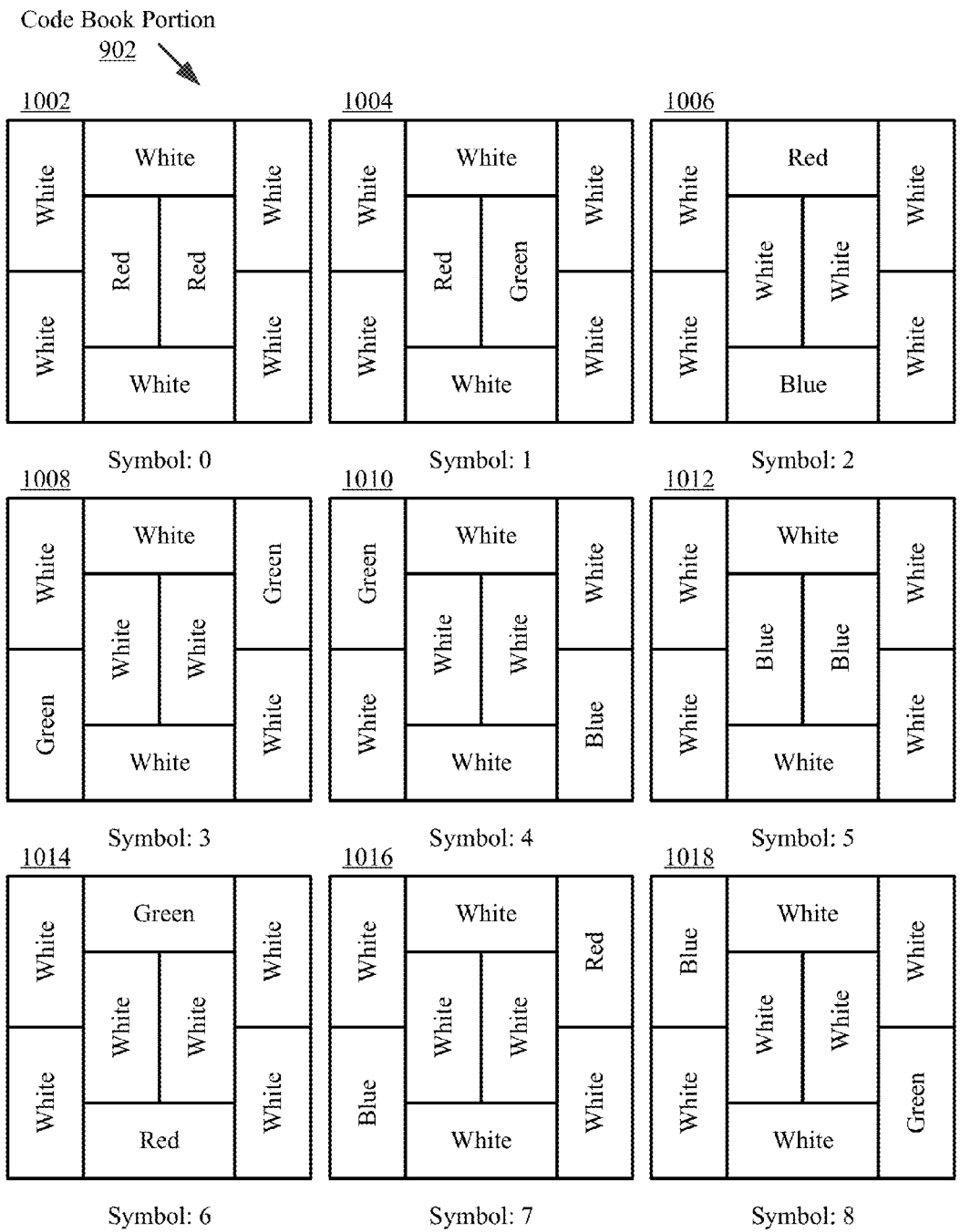
Figure 11:
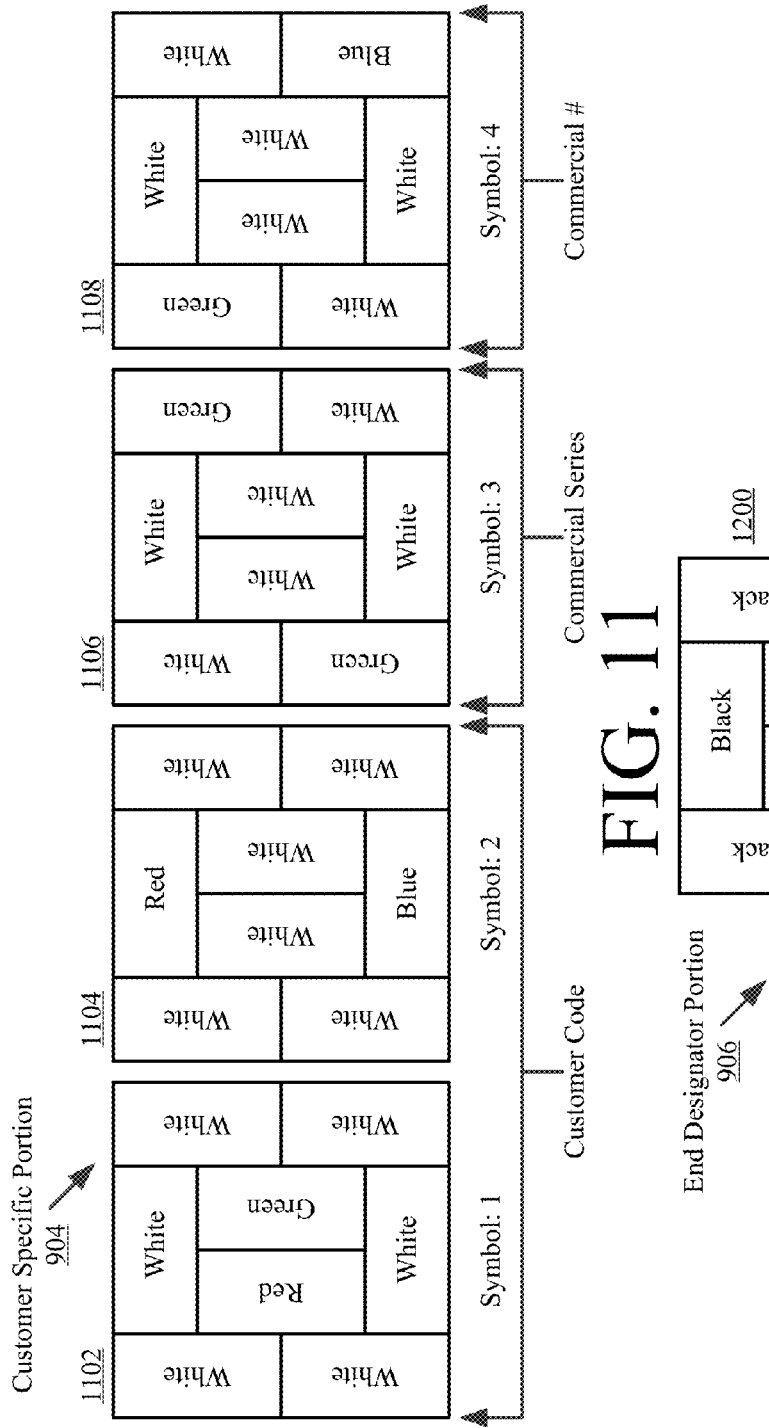
Figure 12:
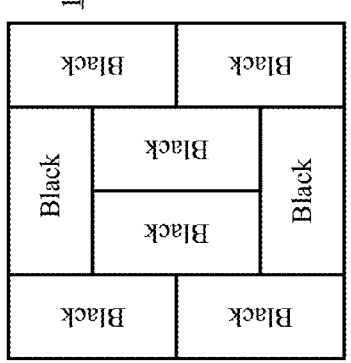
Figure 13:
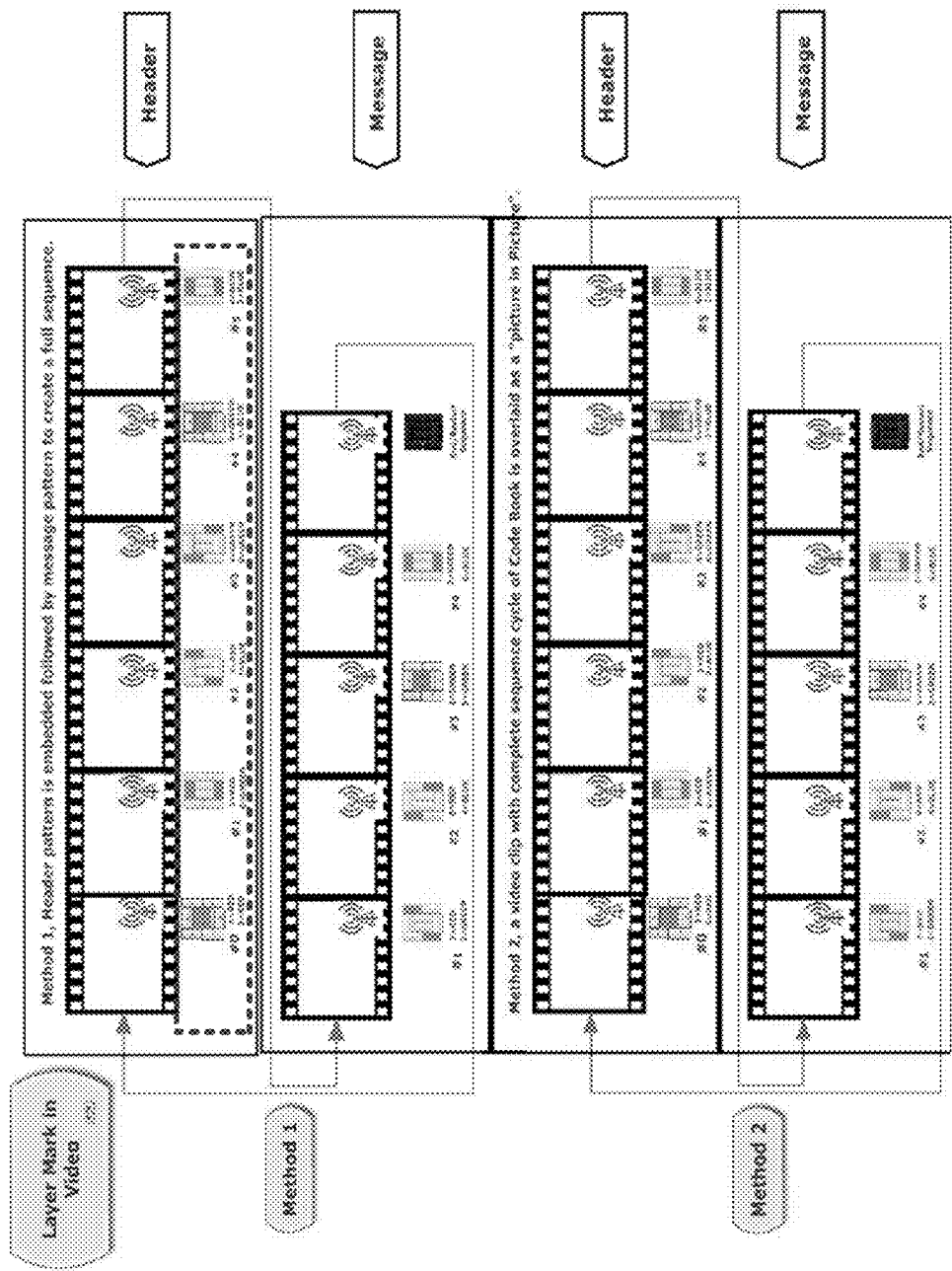
FIG. 13 is a schematic illustration that is useful for understanding how a DDM can be presented along with a video.
Figure 14:
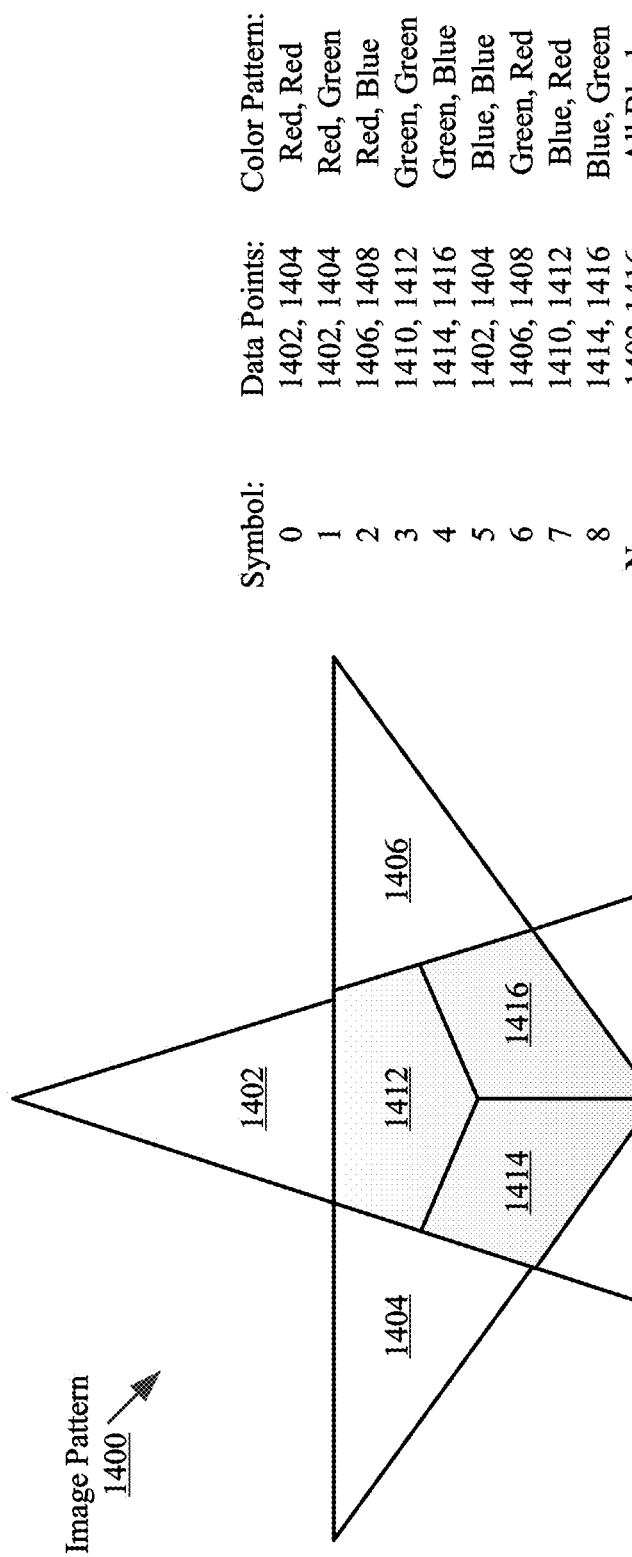
FIG. 14 is a schematic illustration of another architecture for a DDM.

The DDM 112 comprises a sequence of image patterns. Schematic illustrations of exemplary architectures for the DDM are provided in FIGS. 8-12. As shown in FIG. 8, an exemplary DDM image pattern 800 comprises a plurality of pattern regions 802-816 arranged relative to each other so as to form a square shaped image. Each pattern region 802-816 has a generally rectangular shape. The present invention is not limited in this regard. The DDM image pattern 800 can include any overall shape selected in accordance with a particular application. Also, the pattern regions can have any arbitrary shapes selected in accordance with the desired overall shape of the DDM image pattern 800. For example, a DDM image pattern 1400 is designed to have an overall star shape as shown in FIG. 14 with eight data pattern regions 1402-1416. In this case, some of the pattern regions have shapes different from or the same as at least one other data pattern region. More specifically, data regions 1402-1410 have the same shapes. Data regions 1414 and 1416 have the same shapes. Data regions 1412-1416 have different shapes as compared to data regions 1402-1410. This design flexibility of the DDM image pattern allows the DDM to have image patterns with shapes conformed to one or more design marks of a customer (e.g., a star shaped design mark as shown in FIG. 14).

The color pattern of the pattern region 802-816 specifies which symbol of a plurality of symbols is represented by the image pattern 800. Different combinations of the three colors Red ("R"), Green ("G") and Blue ("Blue") define a numeric (e.g., heximal) system. However, the present invention is not restricted to any specific numeral system. Each symbol in the numeric system is determined by two colors. The correspondence between color combinations and symbols is called a "code book". Although there are twenty-eight different pairs of pattern regions in FIG. 8 that can be used to signal a symbol, only the following four pairs are considered for illustration purpose: 802, 804; 806, 808; 810, 812; and 814, 816.

As shown in FIG. 8, an assumption is made that the symbols include nine digits 0-8. A symbol 0 is represented by an image pattern with two pattern regions 802, 804 appearing in red and all remaining pattern regions 806-816 appearing in a background color (e.g., white or a light yellow). A symbol 1 is represented by an image pattern with a pattern region 802 appearing in red, a pattern region 804 appearing in green, and all remaining pattern regions 806-816 appearing in a background color (e.g., white or light yellow). A symbol 2 is represented by an image pattern with a pattern region 806 appearing in red, a pattern region 808 appearing in blue, and all remaining pattern regions 802, 804, 810-816 appearing in a background color (e.g., white or a light yellow). A symbol 3 is represented by an image pattern with pattern regions 810, 812 appearing in green, and all remaining pattern regions 802-808, 814, 816 appearing in a background color (e.g., white or a light yellow). A symbol 4 is represented by an image pattern with a pattern region 814 appearing in green, a pattern region 816 appearing in blue, and all remaining pattern regions 802-812 appearing in a background color (e.g., white or a light yellow). A symbol 5 is represented by an image pattern with pattern regions 802, 804 appearing in blue, and all remaining pattern regions 806-816 appearing in a background color (e.g., white or a light yellow). A symbol 6 is represented by an image pattern with a pattern region 806 appearing in green, a pattern region 808 appearing in red, and all remaining pattern regions 802, 804, 810-816 appearing in a background color (e.g., white or a light yellow). A symbol 7 is represented by an image pattern with a pattern region 810 appearing in blue, a pattern region 812 appearing in red, and all remaining pattern regions 802-808, 814, 816 appearing in a background color (e.g., white or a light yellow). A symbol 8 is represented by an image pattern with a pattern region 814 appearing in blue, a pattern region 816 appearing in green, and all remaining pattern regions 802-812 appearing in a background color (e.g., white or a light yellow). An image pattern representing no symbol comprises pattern regions 802-816 appearing in black. The present invention is not limited to the particulars of this example. Any type of symbols and/or color pattern can be employed without limitation.

Notably, an image pattern representing a symbol is referred to herein as an active image pattern. In contrast, an image pattern that does not represent a symbol (i.e., all pattern regions are black) is referred to herein as an inactive image pattern. In some scenarios, the activated pairs of pattern regions repeatedly follow the sequence 802/804, 806/808, 810/812, 814/816. In this way, a message is transmitted by a sequence of active image patterns. The variation of colors in active regions encodes the message being sent. The start of a message can be detected as the first active image pattern following an inactive image pattern, while an inactive image pattern following an active image pattern indicates the end of a message. The encoding of a message is not restricted to the variations of colors. Variations of the locations of active regions can also be used to increase the amount of information represented by a single image pattern.

Each active image pattern consists of background pixels with one color tone (e.g., white, light yellow or black) and at least two active regions with different color tones (e.g., R/R, R/G, R/B, G/G, G/R, G/B, B/B, B/R, B/G). An inactive image pattern consists of background pixels with the same or different color tone as the background pixels of an active image pattern (e.g., white, light yellow or black). Connectivity among background pixels is enforced in the design of image patterns. In particular, all background pixels are completely d-connected in each image pattern, which is defined as the following: given any two background pixels at locations x and y, respectively, there exists a connected path on the image such that a ball with diameter d (d>=1 pixel) can be moved from x and y following the path and without touching any of the active regions on the image. Either 4-connectivity or 8-connectivity can be used in defining the connected path.

The above connectivity requirement makes the invented image pattern family distinctive from QR codes, Mcodes, Semacodes and JagTags. The d-connectivity of background pixels is important in controlling the "bleeding" effect among active regions when the pattern is captured by a reader (e.g., a smart device with a video camera). Increasing the d value reduces the "bleeding" effect which in turn increases the distance at which the reader is able to correctly decode the image pattern. In the present case, when the size of the image pattern is just one tenth of a video display, the reader can correctly decode the image pattern captured from the video display at more than six times the height of the screen away from the reader, which is a relatively large distance compared to that of conventional embedded code systems (e.g., QR code based systems).

Referring now to FIGS. 9-12, there is provided schematic illustrations useful for understanding a sequence of image patterns comprising an exemplary DDM 900. The DDM 900 is defined by a code book portion 902, a customer-specific portion 904, and an end designator portion 906. The code book portion 902 comprises a sequence of color coded image patterns 1002-1018. The image patterns 1002-1018 provide reference image patterns that can be used for decoding an image pattern of the customer-specific portion 904. In this regard, each image pattern 1002-1018 comprises a reference pattern for a symbol of a plurality of possible symbols (e.g., 0-8) that can be represented by each image pattern of the customer-specific portion 904.

The code book portion 902 is contained in the DDM 900 for purposes of preventing (a) channel noise, (b) different lighting variations, color variations and color distortions of a plurality of display screens, and (c) variations in the optical characteristics of different image/video capturing devices from causing errors in a subsequent decoding process (which will be described below). Notably, inclusion of the code book portion 902 in the DDM 900 advantageously eliminates any requirement for a viewer's MCD to have pre-set parameters for detecting the image patterns and corresponding symbols. In this regard, it should be understood that the code book portion provides reference image patterns to which the image patterns of the customer-specific portion 904 can be compared for purposes of determining the sequence of symbols represented thereby. Accordingly, the code book portion 902 provides a dynamic calibration system for each individual display screen and its surrounding environment. Thus, the code book portion 902 ensures that the DDM based message delivery technique functions properly regardless of the particular display screen on which the DDM is displayed and/or the surrounding environment in which the display screen resides.

The customer-specific portion 904 is then appended to the end of the code book portion 902. The customer-specific portion 904 is created in some scenarios based on the customer code 702, the commercial series 704 and the commercial number 706. In other scenarios, the customer-specific portion 904 is created based on other criteria (e.g., business entity code, facility identification number, and/or machine/electronic device identification number) selected in accordance with a particular application. The customer-specific portion 904 comprises a sequence of color coded image patterns 1102-1108. Each image pattern represents a respective portion of the sequence of symbols (e.g., digits "1234"). For example, first and second image patterns 1102, 1104 collectively represent the customer code 702 (e.g., digits "12"). A third image pattern 1106 represents the commercial series 704 (e.g., digit "3"). A fourth image pattern 1108 represents a commercial number 706 (e.g., digit "4"). The present invention is not limited to the particulars of this example.

Next, the end designator portion 906 is appended to the end of the customer-specific portion 904. The end designator portion 904 comprises an inactive image pattern (e.g., a solid block pattern). The end designator portion 904 provides a means for a decoding device to detect the end of the DDM 900, and/or the start of a next iterative display of the DDM 900. This will become more evident as the discussion progresses.

Referring again to FIG. 5, step 512 is performed once the computing device 106 of the VCO 162 has possession of the DDM. In step 512, the video and DDM are distributed to a display screen 110 of the viewer 160 directly by the VCO 162 or indirectly through another entity (e.g., a television station). At the display screen 110, the video is presented to the viewer 160 along with the DDM 112, as shown by step 514.

In some scenarios, the DDM is embedded in the video (as shown by method 1 of FIG. 13) by the VCO 162 or other entity (e.g., an advertising agency). Alternatively, the DDM is a separate video clip from the video, and thus is presented to the viewer 160 alone or in a picture-in-picture mode (as shown by method 2 of FIG. 13). Picture-in-picture modes are well known in the art (e.g., multi-vision implementations), and therefore will not be described herein. Any known or to be known picture-in-picture mode can be employed herein without limitation. A picture-in-picture mode can be employed in both pre-recorded and live broadcast scenarios. In the picture-in-picture mode scenarios, algorithms in the content owner's video editing program can be employed to ensure that the underlying video does not affect the subsequent decoding process of the customer-specific portion of the DDM as result of color changes therein.

Notably, the DDM is presented such that the image patterns of the code book portion (e.g., code book portion 902 of FIGS. 9-10), customer specific portion (e.g., customer specific portion 904 of FIGS. 9 and 11), and end designator portion (e.g., end designator portion 906 of FIGS. 9 and 12) are sequentially displayed in the defined order. For example, the image pattern 1002 of the code book portion 902 is displayed first for a given period of time (e.g., 1 tenths of a second). Next, the image pattern 1004 of the code book portion 902 is displayed, followed by image pattern 1006, and so on. The entire DDM may be iteratively displayed N number of times during presentation of the video, where N is an integer value. Each iteration is separated by an end designator or inactive image pattern. As a consequence of the changing image pattern, simultaneous changes in color and location of active regions in the DDM create a visually dynamic mark on the video display which is visible yet not annoying to a viewer 160. The DDM may be accompanied with text such as "Scan Now" so that the viewer 160 knows when to activate and direct the MCD 102 at the DDM for processing.

While the DDM is being displayed, the viewer 160 uses the MCD 102 to capture the DDM via a video camera 218 thereof, as shown by step 516 of FIG. 5. In response to such capturing, a decoding application 256 installed on the MCD 102 is caused to perform decoding operations, as shown by step 518 of FIG. 5. The decoding operations involve: processing the video of the captured DDM to extract at least one iteration thereof; processing the extracted iteration to detect each image pattern (e.g., image patterns 1002-1018 of FIG. 10, 1102-1108 of FIG. 11, 1200 of FIG. 12) thereof; processing each image pattern e.g., image patterns 1002-1018 of FIG. 10) of the code book portion (e.g., code book portion 902 of FIGS. 9 and 10) to determine reference image patterns and corresponding reference symbols (e.g., 0-8) thereof; and processing each image pattern (e.g., image patterns 1102-1108 of FIGS. 9 and 11) of the customer-specific portion (e.g., customer specific portion 904 of FIGS. 9 and 11) of the DDM to determine the corresponding sequence of symbols represented thereby using the previously determined reference image patterns and corresponding reference symbols.

In some scenarios, error detection and correction techniques are used to ensure that the correct sequence of symbols represented by the customer-specific portion of the DDM is ultimately obtained as a result of the decoding operations. Error detection and correction techniques are well known in the art, and therefore will not be described herein. Any known or to be known error detection and correction technique can be used herein without limitation.

Alternatively or additionally, the decoding operations involve performing pre-processing operations to identify which of a plurality of DDM iterations has the least amount of error(s). The identified DDM iteration is then selected and used in the decoding process to determine the corresponding sequence of symbols represented thereby.

Also, in some scenarios, a pattern classifier is employed. The pattern classifier predicts the most likely symbol based on the color content of a region. The pattern classifier is dynamic in nature. Specifically, the pattern classifier is self-adjusted in each message sequence based on the received header information, i.e., patterns of the code book portion. In this way, the system reduces the adverse effect caused by variations of lighting condition and possible color distortions.

Figure 17:
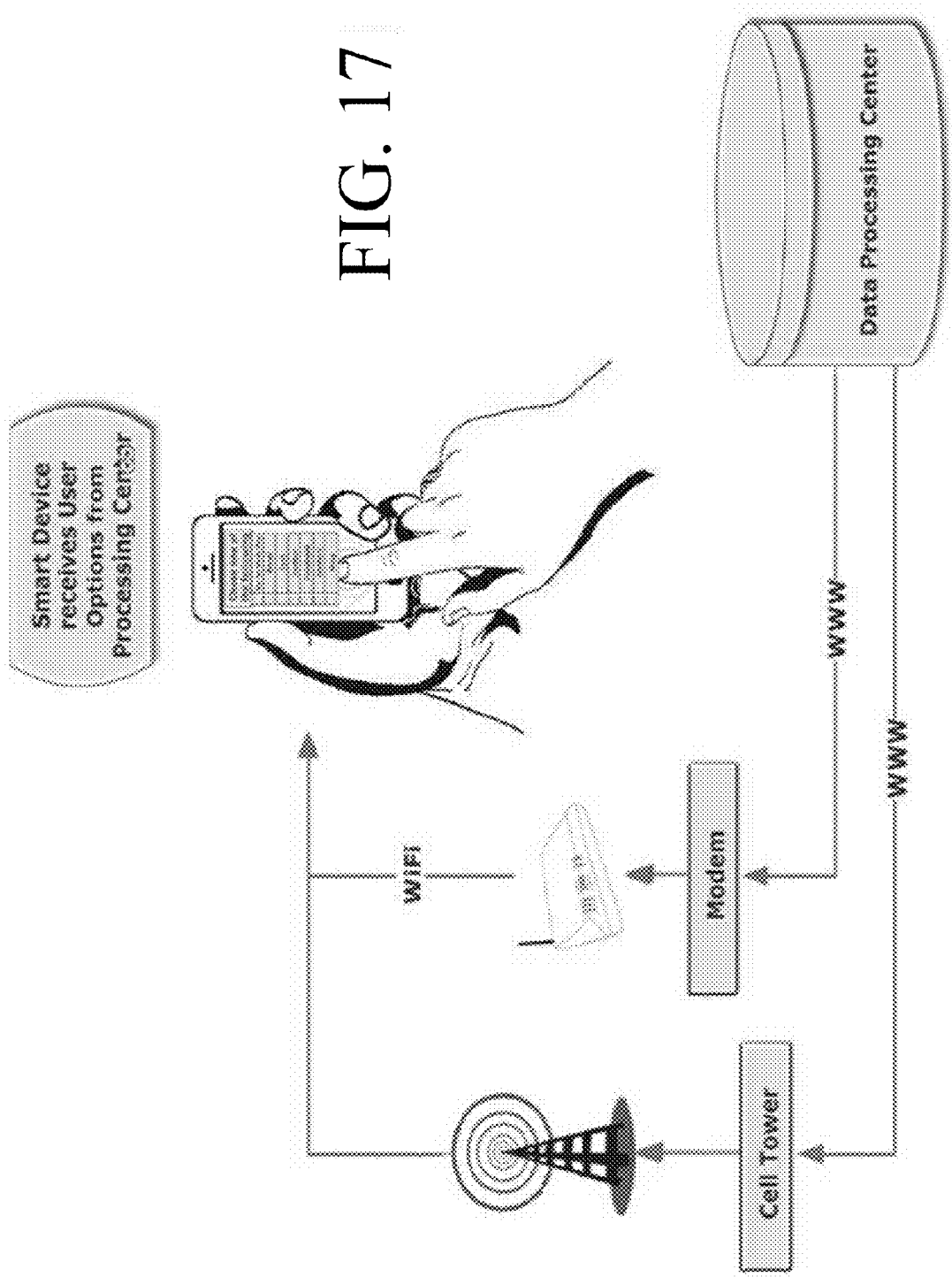
FIG. 17 is a schematic illustration of a mobile communications device receiving selectable content from a data processing center of a mark provider.

After the MCD 106 determines the symbol sequence (e.g., digits "1234") represented by the customer-specific portion of the DDM, it forwards the same to a server 114 of the MG facility 154, as shown by step 520 of FIG. 5. At the MG facility 154, step 522 is performed where the symbol sequence is processed to determine if it matches one of a plurality of symbol sequences stored in a database 116. If the symbol sequence does not match one of the stored symbol sequences [524:NO], then the process ends or other processing is performed (e.g., output an indication to the viewer that the captured DDM could not be decoded), as shown by step 526. In contrast, if the symbol sequence matches one of the stored symbol sequences [524:YES], then the server 114 performs operations to cause at least one VCO specified event to occur, as shown by step 528. For example, the server 114 may perform operations such as: query a sponsor/offer database (as shown in FIG. 17) for offers/coupons; and transmit available offers/coupons or other advertisement material in a digital format directly to the MCD 106 or via an electronic message (e.g., a text message, web browser or an electronic mail message). The offer/coupon could then be saved in a shopping application residing on the MCD and then used at a Point Of Sale ("POS"). In this case, a code contained in the coupon can be obtained by a barcode reader or other short range communication device (such as a Near Field Communication device) of the POS for redemption. Additionally or alternatively, the server 114 may perform operations to send a given URL to a web browser 252 of the MCD 106, whereby the viewer 160 is shown particular web content specified by the VCO. The web content can include an interface in which the viewer 160 can select at least one option from a plurality of options (e.g., a web page from which one or more items can be purchased, or from which a coupon/offer may obtained or forwarded to a friend). In this case, the MCD 106 may communicate to the server 114 information specifying the viewer's selection of the option. In response to the reception of this information, the server 114 completes the process. Additionally or alternatively, rewards points can be awarded to the owner of the MCD as described below.

Figure 15:
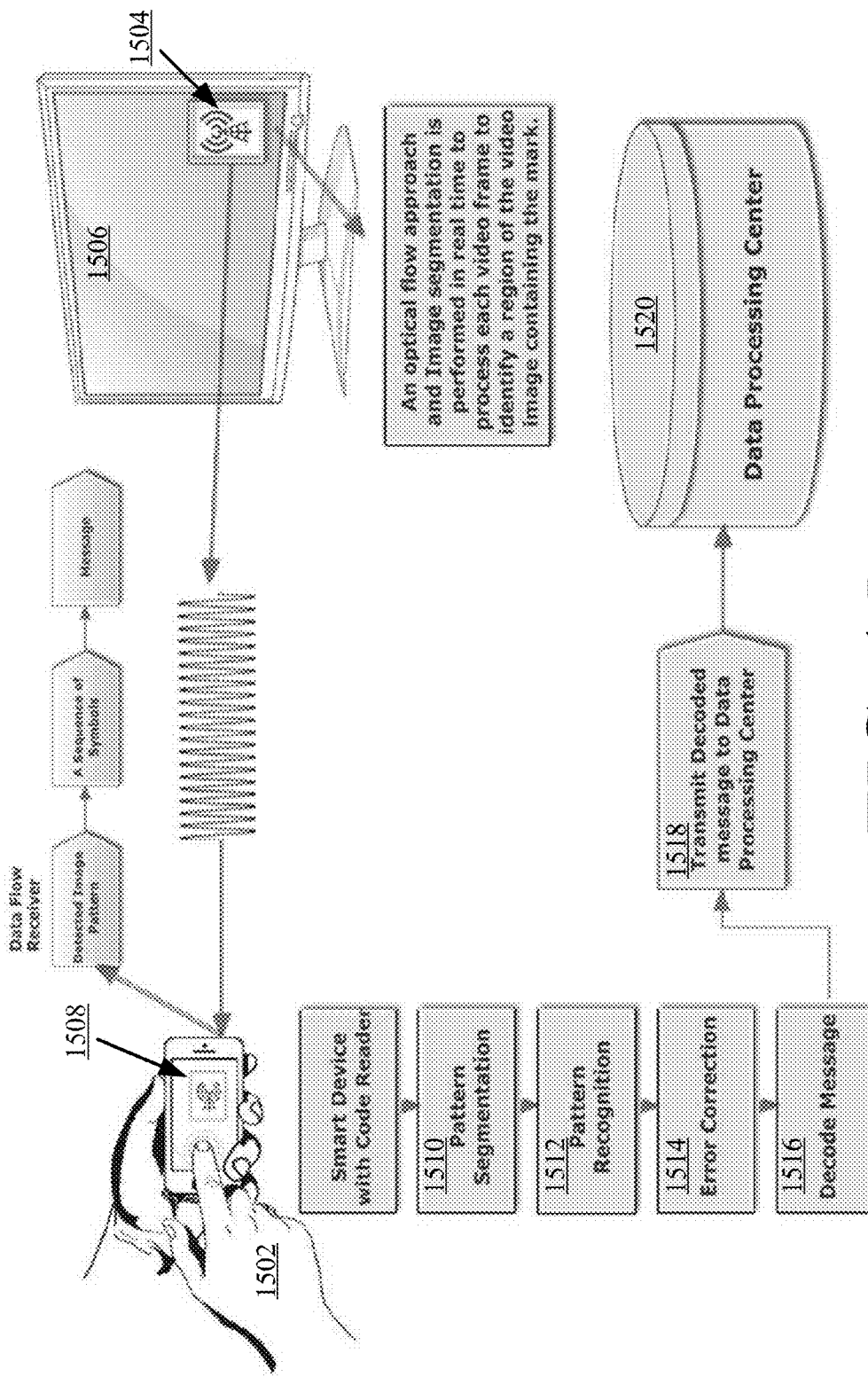
FIG. 15 is a schematic illustration showing a mobile communication device receiving and decoding data acquired from a DDM presented along with a video.
Figure 16:
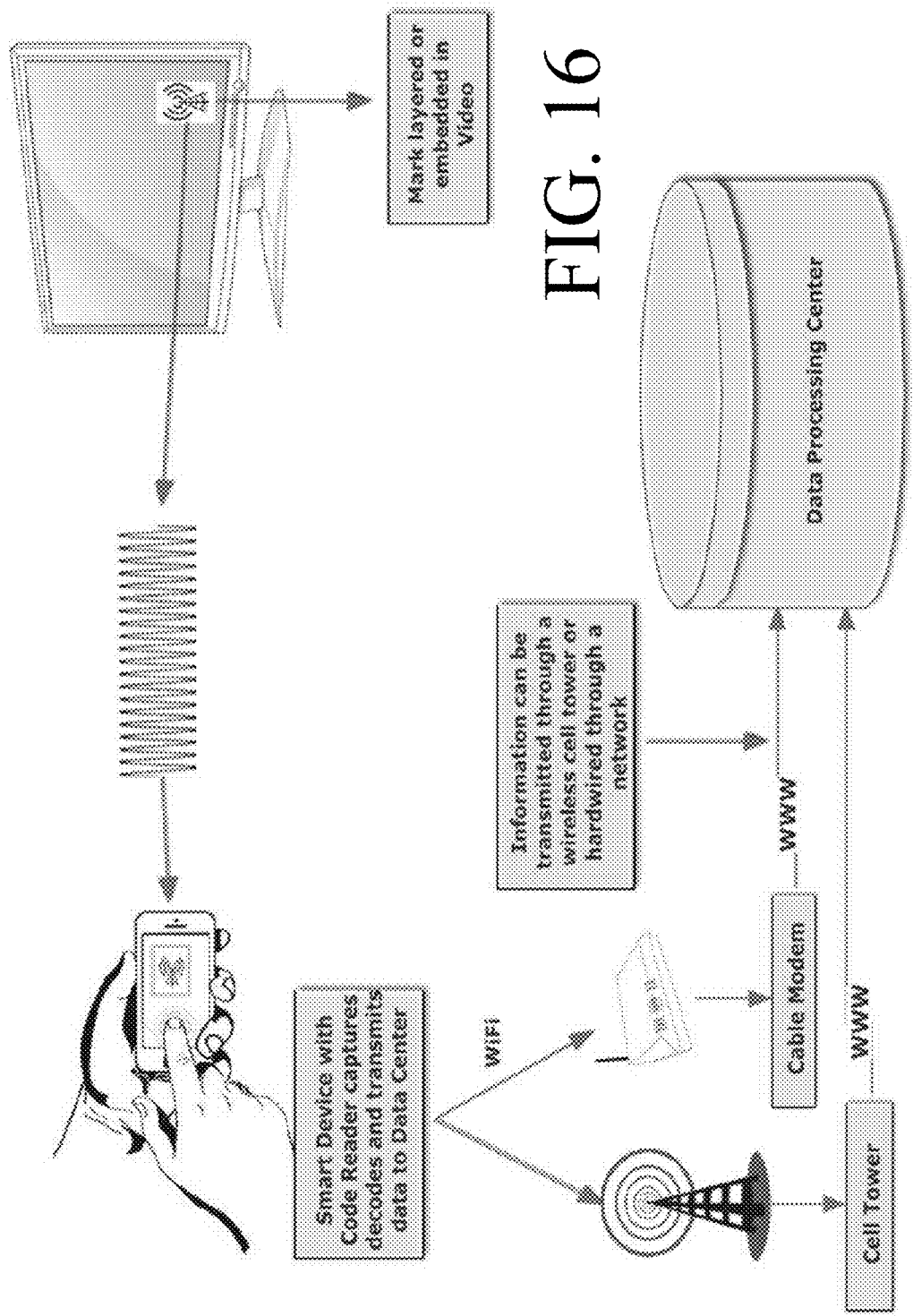
FIG. 16 is a schematic illustration showing a mobile communications device transmitting decoded information acquired from a DDM to a data processing center of a mark provider.
Figure 18:
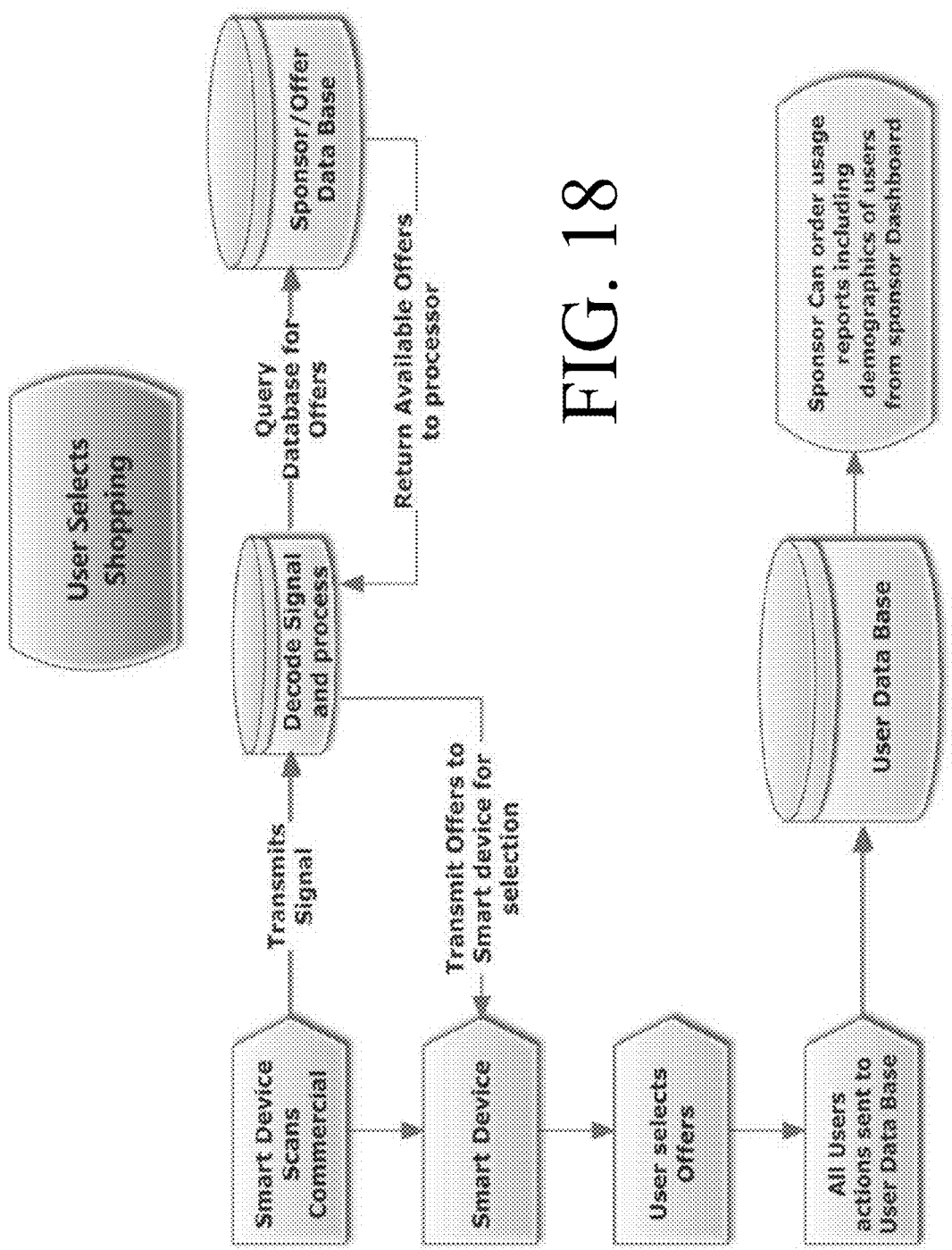
FIG. 18 is a schematic illustration showing an exemplary process for purchasing an item using content (e.g., a coupon/promotional offers) obtained as a result of capturing a DDM displayed in conjunction with a video.
Figure 19:
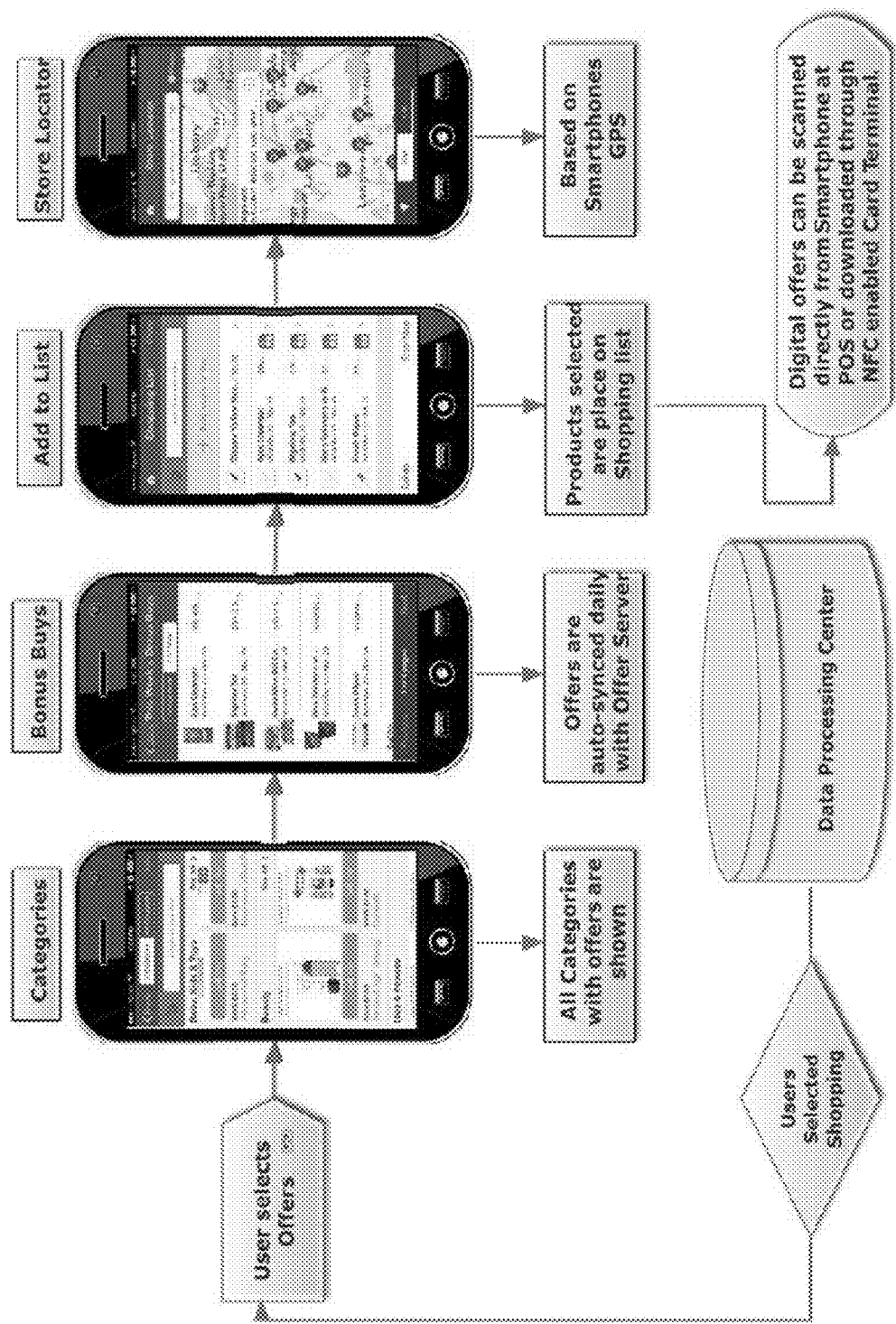
FIG. 19 is a schematic illustration showing an exemplary process for selecting and downloading digital coupons/offers to a shopping software application running on a mobile communications device.

FIG. 15 provides another schematic illustration of operations performed in accordance with the present invention. In FIG. 15, an optical flow approach and image segmentation is performed in real time to process each video frame to identify a region of the video image containing the DDM. As such, a viewer 1502 captures a DDM 1504 displayed on a display device 1506 along with a video. The DDM is captured using a video camera of a smart device 1508. The smart device 1508 has a code reader. The code reader may be implemented as hardware and/or software. In the software scenarios, a code reader/decoding software application is installed on the smart device 1508. This software application enables the smart device 1508 to perform various operations shown by functional blocks 1510-1518: segment image patterns from a captured video; recognize one or more image patterns from a captured video; perform any necessary error correction; decode the message (i.e., determine which symbol of a plurality of symbols is represented by each image pattern of a sequence of image patterns; perform any necessary error correction); and transmit the decoded message (e.g., a sequence of symbols) to a data processing center 1520. The decoded message may be transmitted to the data processing center using any known or to be known communications technology (such as WiFi based technology, cell tower based technology, and/or cable modem based technology as shown in FIG. 16). At the data processing center 1520, the decoded message is processed to determine if any action should be taken, such as provide a coupon or other information to the viewer 1502 as shown in FIG. 17. In some scenarios, the viewer 1502 may be prompted to respond to a message sent to the smart device 1508 in response to the decoded message. For example, as shown in FIGS. 18 and 19, the action comprises a shopping based action for facilitating online shopping by the viewer 1502.

MCD Architecture

Figure 3:
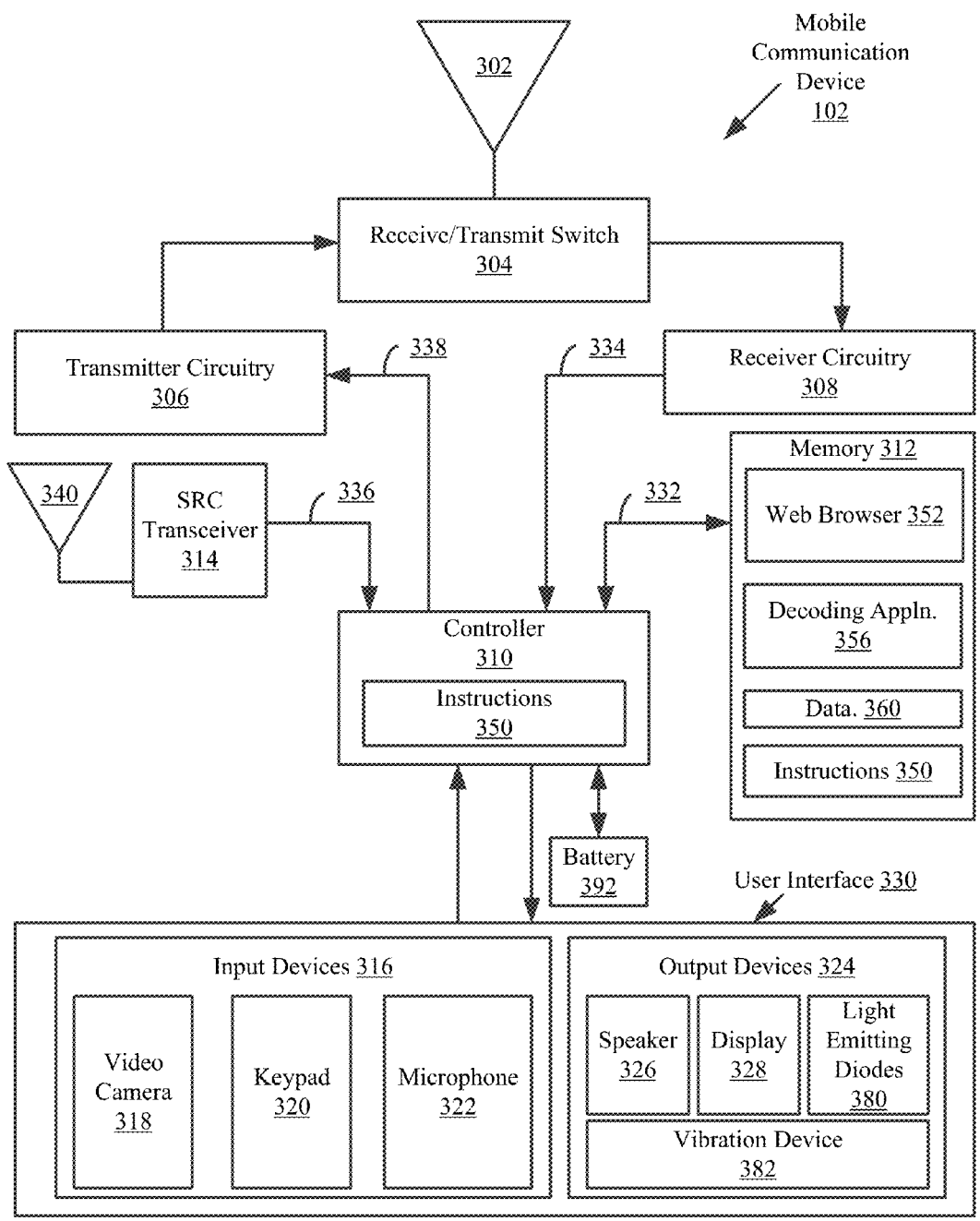
FIG. 3 is a schematic illustration of an exemplary architecture for the mobile communication device shown in FIG. 1.

Referring now to FIG. 3, there is provided a schematic illustration of an exemplary architecture for the MCD 102. MCD 102 may include more or less components than those shown in FIG. 3. However, the components shown are sufficient to disclose an illustrative embodiment implementing the present invention. Some or all of the components of the MCD 102 can be implemented in hardware, software and/or a combination of hardware and software. The hardware includes, but is not limited to, one or more electronic circuits.

As noted above, MCD 102 can include, but is not limited to, a notebook computer, a personal digital assistant, a cellular phone or a mobile phone with smart device functionality (e.g., a Smartphone). In this regard, the MCD 102 comprises an antenna 302 for receiving and transmitting Radio Frequency ("RF") signals. A receive/transmit ("Rx/Tx") switch 304 selectively couples the antenna 302 to the transmitter circuitry 306 and the receiver circuitry 308 in a manner familiar to those skilled in the art. The receiver circuitry 308 demodulates and decodes the RF signals received from an external device. The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 102. The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device via the Rx/Tx switch 304.

MCD 102 also comprises an antenna 340 coupled to an SRC transceiver 314 for receiving SRC signals. SRC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application installed on the MCD 102. The SRC application can include, but is not limited to, a Commercial Off the Shelf ("COTS") application. The SRC transceiver 314 is coupled to the controller 310 via an electrical connection 336. The controller uses the extracted information in accordance with the function(s) of the MCD 102.

The controller 310 may store received and extracted information in memory 312 of the MCD 102. Accordingly, the memory 312 is connected to and accessible by the controller 310 through electrical connection 332. The memory 312 may be a volatile memory and/or a non-volatile memory. For example, memory 312 can include, but is not limited to, a RAM, a DRAM, a ROM and a flash memory. The memory 312 may also comprise unsecure memory and/or secure memory. The memory 312 can be used to store various other types of data 360 therein, such as authentication information, cryptographic information, location information, and various article-related information.

As shown in FIG. 3, one or more sets of instructions 350 are stored in memory 312. The instructions may include customizable instructions and non-customizable instructions. The instructions 350 can also reside, completely or at least partially, within the controller 310 during execution thereof by MCD 102. In this regard, the memory 312 and the controller 310 can constitute machine-readable media. The term "machine-readable media", as used herein, refers to a single medium or multiple media that stores one or more sets of instructions 350. The term "machine-readable media", as used here, also refers to any medium that is capable of storing, encoding or carrying the set of instructions 350 for execution by the MCD 102 and that causes the MCD 102 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., software applications 352, 356 and other software applications) installed on MCD 102. Such input and output devices may include, but are not limited to, a display 328, a speaker 326, a keypad 320, a directional pad (not shown in FIG. 3), a directional knob (not shown in FIG. 3), a microphone 322, and a video camera 318. The display 328 may be designed to accept touch screen inputs. As such, user interface 330 can facilitate a user software interaction for launching applications (e.g., software applications 352, 356 and other software applications) installed on MCD 102. The user interface 330 can facilitate a user-software interactive session for capturing and decoding a DDM (e.g., DDM 112 of FIG. 1).

The display 328, keypad 320, directional pad (not shown in FIG. 3) and directional knob (not shown in FIG. 3) can collectively provide a user with a means to initiate one or more software applications or functions of MCD 102. The application software 352, 356 can facilitate the capturing and decoding of a DDM, as well as the communication with a server 114 located at a remote site.

Exemplary Server Architecture

Figure 4:
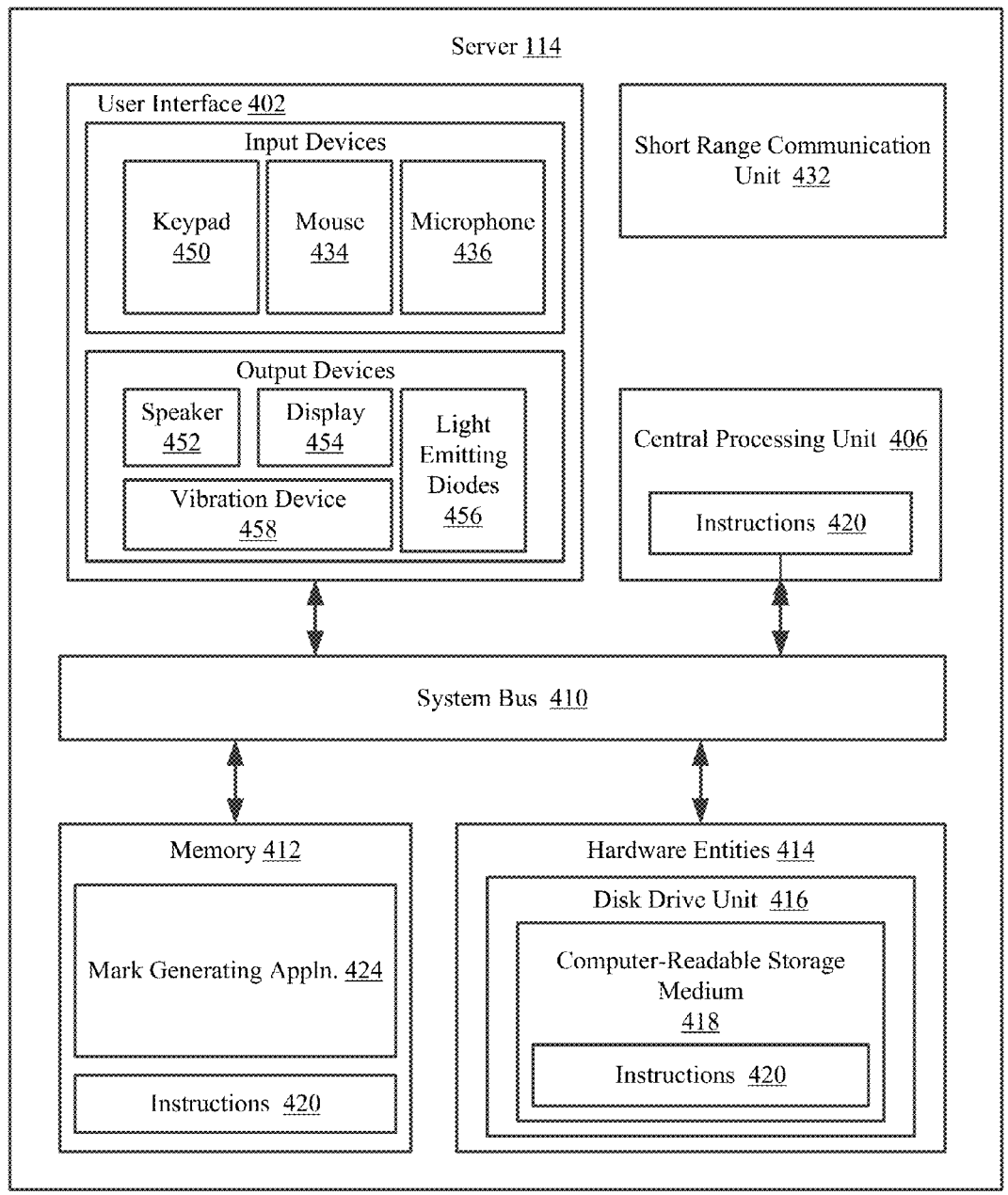
FIG. 4 is a schematic illustration of an exemplary architecture for the computing device shown in FIG. 1.

Referring now to FIG. 4, there is provided a schematic illustration of an exemplary architecture for the server 114. The server 114 may include more or less components than those shown in FIG. 4. However, the components shown are sufficient to disclose an illustrative embodiment implementing the present invention. The hardware architecture of FIG. 3 represents one embodiment of a representative server configured to facilitate the provision of DDM based services. As such, the server 114 of FIG. 4 implements at least a portion of a method for generating a DDM and providing certain services in response to the reception of the DDM at an MCD. Some or all components of the server 114 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 114 comprises a user interface 402, a Central Processing Unit ("CPU") 406, a system bus 410, a memory 412 connected to and accessible by other portions of server 114 through system bus 410, and hardware entities 414 connected to system bus 410. The user interface can include input devices (e.g., a keypad 450, mouse 434 and microphone 436) and output devices (e.g., speaker 452, a display 454, a vibration device 458 and/or light emitting diodes 356), which facilitate user-software interactions for controlling operations of the server 114.

At least some of the hardware entities 414 perform actions involving access to and use of memory 412, which can be a Random Access Memory ("RAM"), a disk driver and/or a Compact Disc Read Only Memory ("CD-ROM"). The server 114 also comprises a Short Range Communication ("SRC") unit 432.

Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 114. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 114 and that cause the server 114 to perform any one or more of the methodologies of the present disclosure.

In some embodiments of the present invention, the hardware entities 414 include an electronic circuit (e.g., a processor) programmed for facilitating the provision of DDM based services. In this regard, it should be understood that the electronic circuit can access and run a software application 424 installed on the server 114. The software application 424 is generally operative to facilitate the creation or generation of a DDM, as well as the communication of the DDM to an external device. The software application 424 is generally operative to facilitate the provision of certain events upon receipt of a symbol sequence represented by a DDM captured via an MCD.

Reward Points Program

As noted above, this disclosure also concerns a rewards program for viewers of DDMs, videos having embedded DDMs or other entertainment associated with DDMs. By offering reward points to viewers, the viewers are encouraged to scan DDMs and engage with pieces of displayed visual entertainment (e.g., an advertisement, a commercial, a TV show, a movie, etc.) in order to receive reward points. The reward points accumulate over time and can be redeemed for valuable merchandise. In some scenarios, reward points can be redeemed via a website or simply by clicking or touching a virtual redeem button provided by a software application (e.g., software applications 352, 356 of FIG. 3 and/or other software applications) executing on an MCD (e.g., MCD 102 of FIG. 1). The redemption of the rewards points can be managed by the provider of the rewards program, the source of the entertainment, or another party.

Notably, an advertiser (or other source of entertainment) can benefit from the rewards program in several ways. For example, when the advertiser captures a viewer's attention such that the viewer scans a DDM displayed along with an advertisement, the advertiser is able to present more detailed information relating to the particular product being advertised to the viewer. The advertiser is also able to make a direct sale from the advertisement, and collect invaluable analytical data on both the advertisement and the viewer.

The cost of the reward points may be built into a per-click fee that the advertiser pays to the provider of the rewards program ("rewards program provider). With this structure, the rewards program provider is able to offer a base number of points for every scan of a DDM. Notably, an algorithm is employed that ensures a pre-specified amount of reward points will be awarded to a viewer who scans a particular DDM once or multiple times during a certain timeframe. In effect, this algorithm prevents the duplicative allotment of reward points to a viewer who scans the same DDM multiple times within the given timeframe. This algorithm may additionally or alternatively be configured to prevent issuance of duplicative charges to the advertiser when a viewer scans the same DDM multiple times within the given timeframe.

Figure 20:
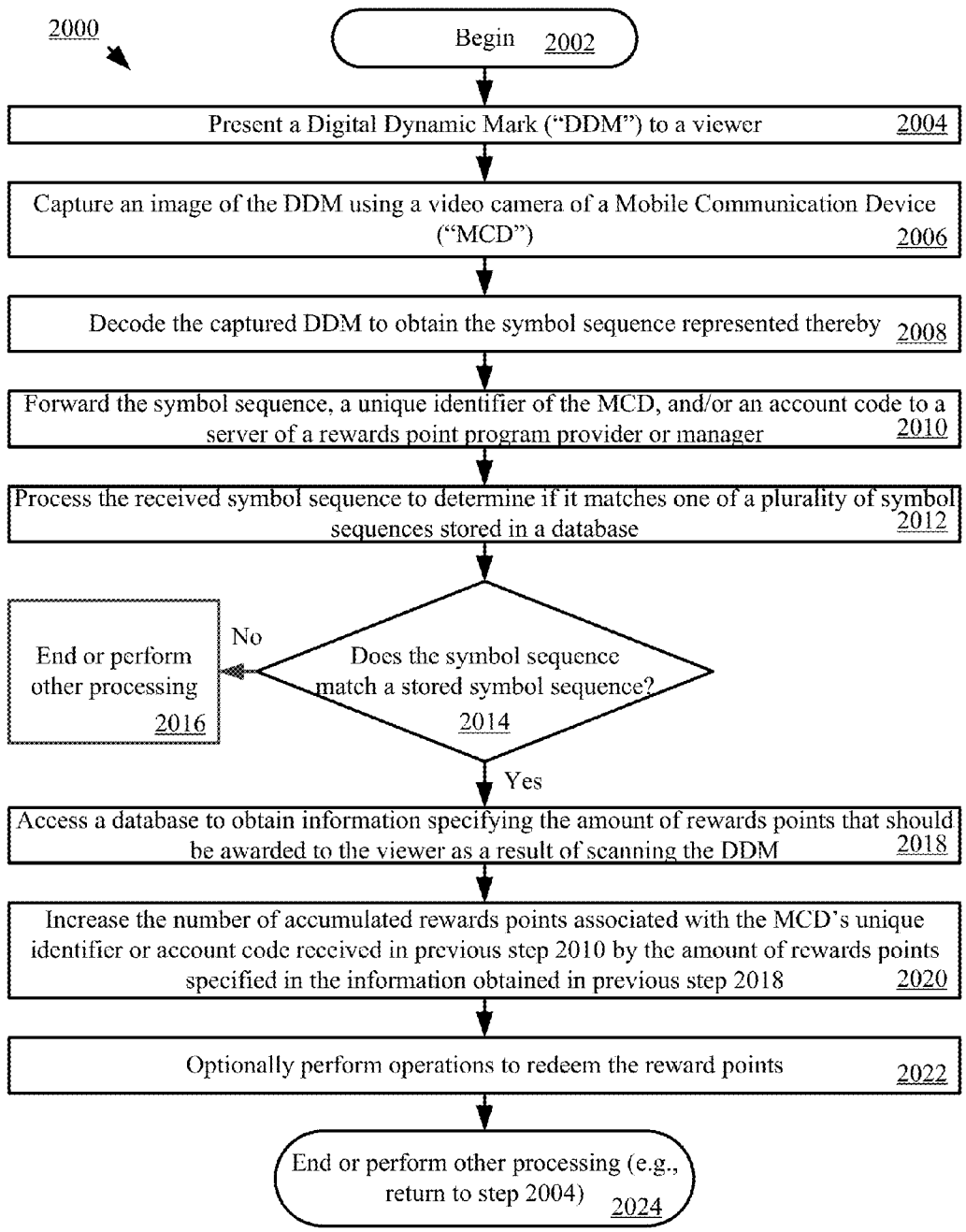
FIG. 20 is a flow diagram of an exemplary method for providing a rewards program to viewers of DDMs.

Referring now to FIG. 20, there is provided a flow diagram of an exemplary method 2000 for providing a rewards program to viewers of DDMs. As shown in FIG. 20, method 2000 begins with step 2002 and continues with step 2004 where a DDM is presented to a viewer (e.g., viewer 160 of FIG. 1). In some scenarios, the DDM is embedded in the video (as shown by method 1 of FIG. 13) by a VCO (e.g., VCO 162 of FIG. 1) or other entity (e.g., an advertising agency). Alternatively, the DDM is a separate video clip from the video, and thus is presented to the viewer alone or in a picture-in-picture mode (as shown by method 2 of FIG. 13).

Notably, the DDM is presented such that the image patterns of the code book portion (e.g., code book portion 902 of FIGS. 9-10), customer specific portion (e.g., customer specific portion 904 of FIGS. 9 and 11), and end designator portion (e.g., end designator portion 906 of FIGS. 9 and 12) are sequentially displayed in the defined order, as described above. The entire DDM may be iteratively displayed N number of times during presentation of the video. Each iteration is separated by an end designator or inactive image pattern. The DDM may be accompanied with text such as "Scan Now" so that the viewer knows when to activate and direct his(her) MCD (e.g., MCD 102 of FIG. 1) at the DDM for processing.

While the DDM is being displayed, the viewer uses the MCD to capture the DDM via a video camera (e.g., video camera 218 of FIG. 2) thereof, as shown by step 2006 of FIG. 20. In response to such capturing, a decoding application (e.g., application 256 of FIG. 2) installed on the MCD is caused to perform decoding operations, as shown by step 2008 of FIG. 20. The decoding operations involve: processing the video of the captured DDM to extract at least one iteration thereof; processing the extracted iteration to detect each image pattern (e.g., image patterns 1002-1018 of FIG. 10, 1102-1108 of FIG. 11, 1200 of FIG. 12) thereof; processing each image pattern (e.g., image patterns 1002-1018 of FIG. 10) of the code book portion (e.g., code book portion 902 of FIGS. 9 and 10) to determine reference image patterns and corresponding reference symbols (e.g., 0-8) thereof; and processing each image pattern (e.g., image patterns 1102-1108 of FIGS. 9 and 11) of the customer-specific portion (e.g., customer specific portion 904 of FIGS. 9 and 11) of the DDM to determine the corresponding sequence of symbols represented thereby using the previously determined reference image patterns and corresponding reference symbols.

After the MCD determines the symbol sequence (e.g., digits "1234") represented by the customer-specific portion of the DDM, it forwards the same to a server (e.g., server 172 of FIG. 1) of a rewards point program provider or manager, as shown by step 2010. A unique identifier of the MCD and/or an account code may also be sent from the MCD to the server along with the symbol sequence. The unique identifier and account code may subsequently be used to award points to a particular individual or account owner.

At the server, step 2012 is performed where the symbol sequence is processed to determine if it matches one of a plurality of symbol sequences stored in a database (e.g., database 116 of FIG. 1). If the symbol sequence does not match one of the stored symbol sequences [2014:NO], then the process ends or other processing is performed (e.g., output an indication to the viewer that the captured DDM could not be decoded), as shown by step 2016. In contrast, if the symbol sequence matches one of the stored symbol sequences [2014:YES], then the server performs steps 2018 and 2020 to award points to the viewer. Steps 2018-2020 involve: accessing a database (e.g., database 174 of FIG. 1) to obtain information specifying the amount of reward points that should be awarded to the viewer as a result of scanning the DDM; and increasing the number of accumulated reward points associated with the MCD's unique identifier or account code received in previous step 2010 by the amount of reward points specified in the information obtained from the database.

Sometime thereafter, the reward points can be redeemed in optional step 2022. Notably, the reward points can be redeemed easily across multiple digital platforms, including via MCDs. The rewards points can be redeemed for cash, gift cards, charitable donations, tangible prizes (e.g., a coffee maker), entertainment related items (e.g., movie tickets, concert tickets, etc.), travel related items (e.g., airplane tickets, train tickets, free hotel stays, free meals at popular restaurants) or other type of redemption options. Subsequently, step 2024 is performed where method 2000 ends or other processing is performed (e.g., return to step 2004).

Figure 21:
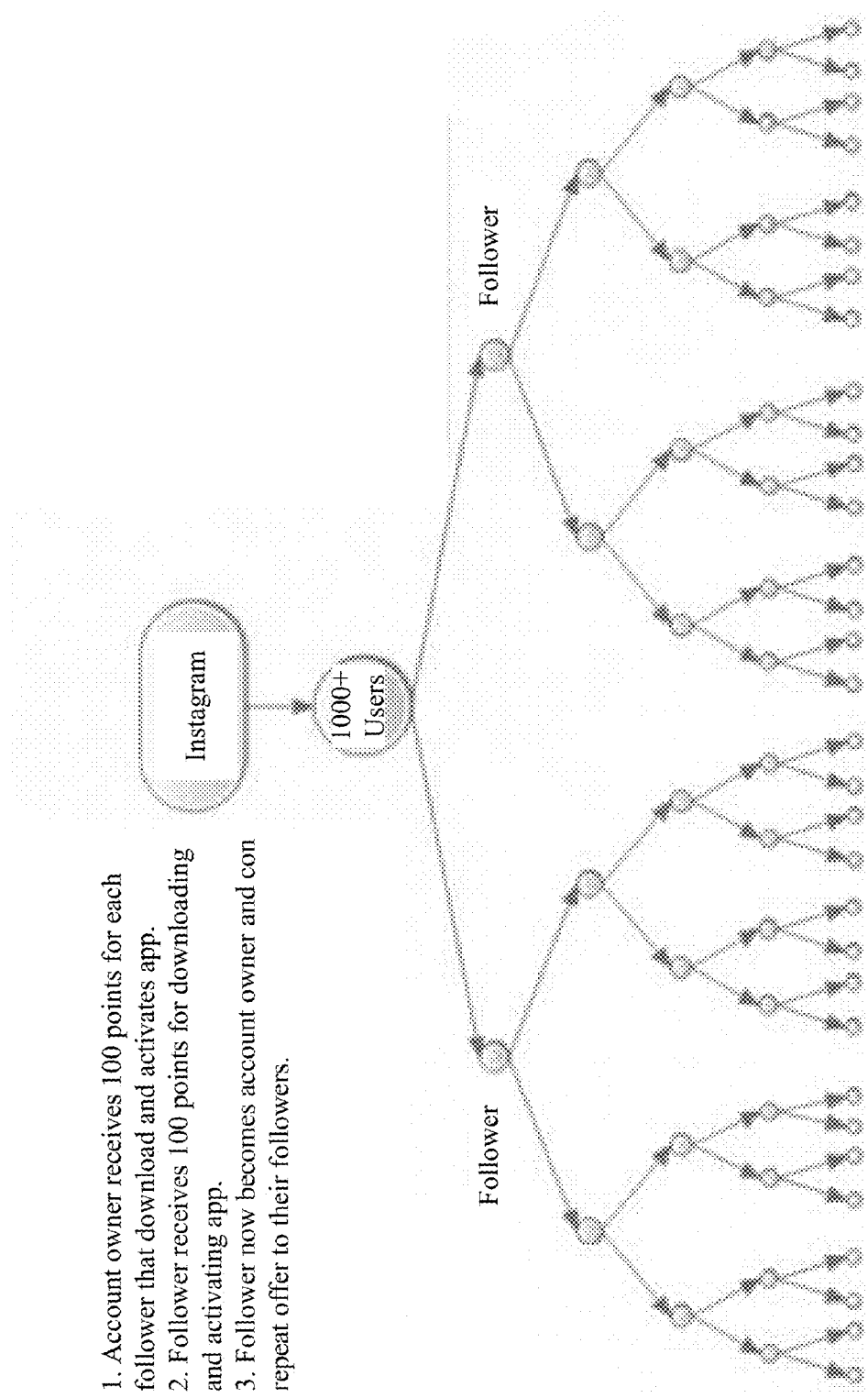
FIG. 21 is a schematic illustration of an exemplary referral plan.

The rewards points program may also provide for awarding reward points based on a referral plan. For example, a business entity may use the reward points program in order to acquire users with its social media marketing program. A schematic illustration of a referral plan is provided in FIG. 21. As shown in FIG. 21, the referral plan comprises four levels: a first level involving an account owner registration and shout out; a second level involving a follower registration and shout out; a third level involving a grand points contest; and a fourth level in which the account owners use software applications downloaded to their MCDs to scan DMMs and accumulate reward points (as described above) and/or bonus points.

Many social sites (such as Instagram®) are structured so that the account owner has an unlimited number of followers. It is not uncommon for the account owner to market items to their followers by using what is known as a shout out, whereby the account owner simply sends out a message (or advertisement) to all of his(her) followers in order to get them to respond. Accordingly, the referral plan is shown in FIG. 21 as employing the Instagram® social site and shout outs. The present invention is not limited in this regard. Other social sites can be used for purposes of implementing the referral plan.

Referring now to FIG. 22, there is provided an exemplary method 2200 for providing a referral plan in which points are awarded to account owners and followers thereof. Method 2200 begins with step 2202 and continues with step 2204 where a DDM scanning/decoding software application (e.g., software application 356 of FIG. 3) is downloaded to a first computing device (e.g., MCD 102 of FIG. 1) of a first person (e.g., person 160 of FIG. 1). Thereafter in a next step 2206, the first person performs operations using the first computing device to register as a first account owner of a reward points program. In response to said registration, reward points (e.g., 100 points) are awarded to the first account owner, as shown by step 2208. Next, an advertisement for the reward points program is downloaded to the first computing device in step 2210. The first account owner then issues a shout out in step 2212 which sends the advertisement to all of his(her) followers.

In response to the shout out, step 2214 is performed by at least one of the first account owner's followers. Step 2214 involves downloading the DDM scanning/decoding software application to a second computing device. The follower then registers himself(herself) as a second account owner of the reward points program, as shown by step 2216. In a next step 2218, reward points are awarded to the first account owner and/or second account owner in response to the second account owner's registration. The advertisement for the reward points program is then downloaded in step 2220 to the second computing device. The second account owner then issues a shout out in step 2222 which sends the advertisement to all of his(her) followers. In response to the shout out(s), other followers of the first and/or second account owners may optionally perform steps 2214-2222, as shown by optional step 2224.

Upon completing step 2222 or 2224, method 2200 continues with steps 2226-2230. These steps involve: automatically entering the first and second account owners into a grand prize contest; optionally performing DDM scanning/decoding/forwarding operations by the computing device of the registered account owners, whereby additional reward points and/or bonus points are respectively awarded thereto; and optionally awarding prizes (e.g., cash prizes) to the top N account owners with the greatest number of accumulated reward points which have entered the grand prize context. N is an integer (e.g., seven).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for providing a rewards program, the method comprising:
    presenting a video comprising a Digital Dynamic Mark ("DDM") to a first viewer, the DDM comprising a sequence of active image patterns, where
        each said active image pattern exclusively comprises a plurality of first pattern regions for encoding symbols,
        at least two pattern regions of said plurality of first pattern regions are rendered with at least one color other than a defined background color for the image pattern,
        said plurality of first pattern regions are arranged in a non-grid like pattern, and
        each of said plurality of first pattern regions has a non-square shape with a single side boundary line directly abutting a single side boundary line of at least one other first pattern region, whereby no spacing is provided between adjacent ones of said plurality of first pattern regions;
    receiving information indicating that the first viewer captured an image of the DDM using a computing device thereof; and
    awarding reward points to the first viewer for capturing said image of the DDM, the reward points redeemable by the first viewer for at least one of a plurality of redemption items.

2. The method according to claim 1, wherein said sequence of first active image patterns is appended to an end of a sequence of second active image patterns, each said second active image pattern indicating which symbol of a plurality of symbols is represented by a particular active image pattern that may possibly be contained in a customer-specific portion of any one of a plurality of DDMs.

3. The method according to claim 2, wherein the DDM is presented as a sequential display of said sequence of first active image patterns and said second active image patterns.

4. The method according to claim 1, wherein an inactive image pattern is appended to an end of said sequence of first active image patterns, said inactive image pattern comprising a plurality of second pattern regions all rendered with said defined background color or black.

5. The method according to claim 4, wherein the DDM is presented as a sequential display of said sequence of first active image patterns and said inactive image pattern.

6. The method according to claim 1, wherein each said first pattern region has a rectangular shape in which said single side boundary line directly abuts said single side boundary line of at least two other first pattern regions.

7. The method according to claim 1, wherein at least two of said plurality of first pattern regions have different shapes.

8. The method according to claim 1, wherein said image pattern has an overall shape conforming to a design mark of said first entity.

9. The method according to claim 1, wherein said two pattern regions are rendered with two different colors other than a defined background color for the image pattern.

10. The method according to claim 1, wherein any two background pixels are connected by a path consisting entirely of background pixels.

11. The method according to claim 1, further comprising awarding reward points to each of a plurality of individuals for registering with the rewards program.

12. The method according to claim 11, wherein at least a first individual of said plurality of individuals is a follower of at least a second individual of said plurality of individuals on a social media site.

13. A method for using a Digital Dynamic Mark ("DDM") to obtain reward points, comprising:
    capturing a first DDM being presenting along with or as a first video using a video camera of a computing device, said first DDM comprising a sequence of first active image patterns each encoding a respective one of a plurality of symbols uniquely identifying at least a first entity, where
        each of said first active image patterns exclusively comprises a plurality of first pattern regions for encoding symbols,
        at least two pattern regions of said plurality of first pattern regions are rendered with at least one color other than a defined background color for the first active image patterns,
        said plurality of first pattern regions are arranged in a non-grid like pattern, and
        each of said plurality of first pattern regions has a non-square shape with a single side boundary line directly abutting a single side boundary line of at least one other first pattern region, whereby no spacing is provided between adjacent ones of said plurality of first pattern regions;
    decoding by said computing device said first DDM to obtain a sequence of decoded symbols; and
    communicating said sequence of decoded symbols from said computing device to a remote computing device whereat at least one first point of said reward points is awarded to an individual associated with the computing device for capturing said first DDM using said video camera.

14. The method according to claim 13, wherein said first DDM further comprises a sequence of second active image patterns indicating which symbol of a plurality of symbols is represented by a particular active image pattern that may possibly be contained in a customer-specific portion of any one of a plurality of DDMs.

15. The method according to claim 13, wherein said first DDM further comprises an inactive image pattern comprising a plurality of second pattern regions all rendered with said defined background color or black.

16. The method according to claim 13, wherein each said first pattern region has a rectangular shape in which said single side boundary line directly abuts said single side boundary line of at least two other first pattern regions.

17. The method according to claim 13, wherein at least two of said plurality of first pattern regions have different shapes.

18. The method according to claim 13, wherein each of said first active image patterns has an overall shape conforming to a design mark of said first entity.

19. The method according to claim 13, wherein at least one second point of said reward points is awarded to said individual in response to said individual's registration with a rewards program.

20. The method according to claim 19, wherein at least one third point of said reward points is awarded to a follower of said individual on a social media site for said follower's registration with said rewards program.

* * * * *